United States Patent
Sasaki

(10) Patent No.: US 11,720,241 B2
(45) Date of Patent: Aug. 8, 2023

(54) CONTENT DELIVERY SYSTEM AND CONTENT DELIVERY METHOD

(71) Applicants: SMILE TV CO., LTD., Tokyo (JP); Toshiro Sasaki, Kanagawa (JP)

(72) Inventor: Toshiro Sasaki, Kanagawa (JP)

(73) Assignee: SMILE TV CO., LTD., Tokyo (JP)

( * ) Notice: Subject to any disclaimer, the term of this patent is extended or adjusted under 35 U.S.C. 154(b) by 0 days.

(21) Appl. No.: 17/703,571

(22) Filed: Mar. 24, 2022

(65) Prior Publication Data

US 2022/0214799 A1 Jul. 7, 2022

Related U.S. Application Data

(63) Continuation of application No. 16/647,367, filed as application No. PCT/JP2017/037377 on Oct. 16, 2017, now Pat. No. 11,320,970.

(51) Int. Cl.

| | |
|---|---|
| *G06F 3/04842* | (2022.01) |
| *G06F 9/451* | (2018.01) |
| *G06Q 30/0251* | (2023.01) |
| *H04L 41/22* | (2022.01) |
| *H04L 9/40* | (2022.01) |
| *H04L 67/06* | (2022.01) |
| *G06Q 30/02* | (2023.01) |

(52) U.S. Cl.
CPC .......... *G06F 3/04842* (2013.01); *G06F 9/451* (2018.02); *G06Q 30/0264* (2013.01); *H04L 41/22* (2013.01); *H04L 63/0876* (2013.01); *H04L 67/06* (2013.01); *G06Q 30/0281* (2013.01)

(58) Field of Classification Search
CPC . G06F 3/04842; G06F 9/451; G06Q 30/0264; H04L 41/22; H04L 63/0876; H04L 67/06
USPC ......................................................... 715/733
See application file for complete search history.

(56) References Cited

U.S. PATENT DOCUMENTS

| | | | | |
|---|---|---|---|---|
| 6,717,522 | B1 * | 4/2004 | Nagatomo | G06Q 20/105 340/5.91 |
| 9,423,998 | B2 * | 8/2016 | Dziuk | G11B 27/34 |
| 9,483,109 | B2 * | 11/2016 | Waldman | G06F 16/7844 |
| 2017/0168764 | A1 * | 6/2017 | Kawamori | G06F 11/3476 |
| 2018/0039565 | A1 * | 2/2018 | Rajagopalan | G06F 11/3476 |

(Continued)

FOREIGN PATENT DOCUMENTS

| | | |
|---|---|---|
| JP | 2008-276295 A | 11/2008 |
| JP | 6191976 B1 | 9/2017 |

*Primary Examiner* — William D Titcomb
(74) *Attorney, Agent, or Firm* — Nakanishi IP Associates, LLC

(57) ABSTRACT

A content delivery system (1) is provided with: a content storage unit (61) for storing a plurality of contents that correspond to each of a plurality of kinds of information pertaining to one commodity (12) that is the object of sales promotion; an output unit (18) for outputting one content from among the plurality of contents; a touch panel (15) for displaying a selection input unit (19), which corresponds to the plurality of contents, on a screen; an input acceptance unit (47) for accepting an input operation performed on the selection input unit (19); and a switching unit (48) that, when an input operation is performed on the selection input unit (19), switches a content that corresponds to the selection input unit (19) for output by the output unit (18).

13 Claims, 20 Drawing Sheets

(56) References Cited

U.S. PATENT DOCUMENTS

2018/0160010 A1\*  6/2018  Kaiho ................ H04N 1/00344
2018/0357074 A1\* 12/2018  Sharoni .................. G06F 9/451
2019/0012982 A1    1/2019  Sinohara et al.
2019/0384619 A1\* 12/2019  Leong ..................... G06F 3/167

\* cited by examiner

DISTRIBUTION CONTROL TABLE

| TERMINAL ID | STORE | GROUP NAME | CONTENT FILE NAME | SCHEDULED DOWNLOAD PERIOD | SCHEDULED OUTPUT PERIOD |
|---|---|---|---|---|---|
| T0001 | STORE A | KANTO 1 | COMMERCIAL PRODUCT A | 2017/09/29~2017/10/06 | 2017/10/07~2017/10/09 |
| T0002 | STORE A | KANTO 1 | COMMERCIAL PRODUCT B | 2017/09/25~2017/09/29 | 2017/09/30~2017/10/01 |
| T0003 | STORE B | KANSAI 3 | COMMERCIAL PRODUCT A | 2017/09/29~2017/10/06 | 2017/10/07~2017/10/09 |
| ... | ... | ... | ... | ... | ... |

FIG. 9A

TERMINAL CONTROL TABLE

| TERMINAL ID | TERMINAL NAME | STORE | GROUP NAME | CONTENT FILE NAME | ACCESS INTERVAL | START TIME | OUTAGE TIME |
|---|---|---|---|---|---|---|---|
| T0001 | H01-001A | STORE A | KANTO 1 | COMMERCIAL PRODUCT A | EVERY FIVE MINUTES | 10:00 | 20:00 |
| T0002 | H01-002A | STORE A | KANTO 1 | COMMERCIAL PRODUCT B | EVERY FIVE MINUTES | 10:00 | 20:00 |
| T0003 | H01-003A | STORE B | KANSAI 3 | COMMERCIAL PRODUCT A | EVERY FIVE MINUTES | 07:00 | 23:00 |
| ... | ... | ... | ... | ... | ... | ... | ... |

FIG. 9B

CONTENT CONTROL TABLE

| CONTENT ID | CONTENT NAME | DISTRIBUTION PERIOD | DISTRIBUTION STATE | MAIN CONTENT | SUB-CONTENT 1 | SUB-CONTENT 2 | ... |
|---|---|---|---|---|---|---|---|
| C0001 | COMMERCIAL PRODUCT A | 2017/09/01~2017/12/31 | DURING DISTRIBUTION | VIDEO IMAGE A | VIDEO IMAGE B | VIDEO IMAGE C | ... |
| C0002 | COMMERCIAL PRODUCT B | 2017/08/01~2017/10/31 | DURING DISTRIBUTION | VIDEO IMAGE E | VIDEO IMAGE F | VIDEO IMAGE G | ... |
| C0003 | COMMERCIAL PRODUCT C | 2017/07/01~2017/08/31 | DISTRIBUTION FINISHED | VIDEO IMAGE K | VIDEO IMAGE L | VIDEO IMAGE M | ... |
| ... | ... | ... | ... | ... | ... | ... | ... |

FIG. 10A

MESSAGE CONTROL TABLE

| MESSAGE ID | MESSAGE NAME | MESSAGE DETAIL | DISTRIBUTION PERIOD | DISTRIBUTION STATE |
|---|---|---|---|---|
| N0001 | PROMOTION AT STORE A | ALL PRODUCTS WILL BE 3% DISCOUNT TODAY | 2017/09/01~2017/12/31 | DURING DISTRIBUTION |
| N0002 | ENDORSEMENT OF COMMERCIAL PRODUCT L | SALE NEXT WEEK | 2017/08/01~2017/10/31 | DURING DISTRIBUTION |
| N0003 | ENDORSEMENT OF COMMERCIAL PRODUCT G | XXX'S ACCLAIMED PRODUCT | 2017/07/01~2017/08/31 | DISTRIBUTION FINISHED |
| ... | ... | ... | ... | ... |

FIG. 10B

SELECTED FREQUENCY INFORMATION TABLE

| TERMINAL ID | STORE | GROUP NAME | CONTENT FILE NAME | SELECTED TIME | SELECTED FREQUENCY ||| |
|---|---|---|---|---|---|---|---|---|
| | | | | | SUB-CONTENT 1 | SUB-CONTENT 2 | SUB-CONTENT 3 | ... |
| T0001 | STORE A | KANTO 1 | COMMERCIAL PRODUCT A | 2017/09/29 11:15 | 1 | 0 | 0 | ... |
| T0001 | STORE A | KANTO 1 | COMMERCIAL PRODUCT A | 2017/09/29 11:10 | 3 | 0 | 1 | ... |
| T0001 | STORE A | KANTO 1 | COMMERCIAL PRODUCT A | 2017/09/29 11:05 | 1 | 0 | 0 | ... |
| ... | ... | ... | ... | ... | ... | ... | ... | ... |

FIG. 11A

VIEWERSHIP INFORMATION TABLE

| TERMINAL ID | STORE | GROUP NAME | CONTENT FILE NAME | VIEWING TIME | TOTAL VIEWER NUMBER | MALE | FEMALE | 10S | 20S | ... |
|---|---|---|---|---|---|---|---|---|---|---|
| T0001 | STORE A | KANTO 1 | COMMERCIAL PRODUCT A | 2017/09/29 11:15 | 2 | 1 | 1 | 0 | 1 | ... |
| T0001 | STORE A | KANTO 1 | COMMERCIAL PRODUCT A | 2017/09/29 11:10 | 8 | 1 | 7 | 0 | 3 | ... |
| T0001 | STORE A | KANTO 1 | COMMERCIAL PRODUCT A | 2017/09/29 11:05 | 4 | 0 | 4 | 0 | 2 | ... |
| ... | ... | ... | ... | ... | ... | ... | ... | ... | ... | ... |

FIG. 11B

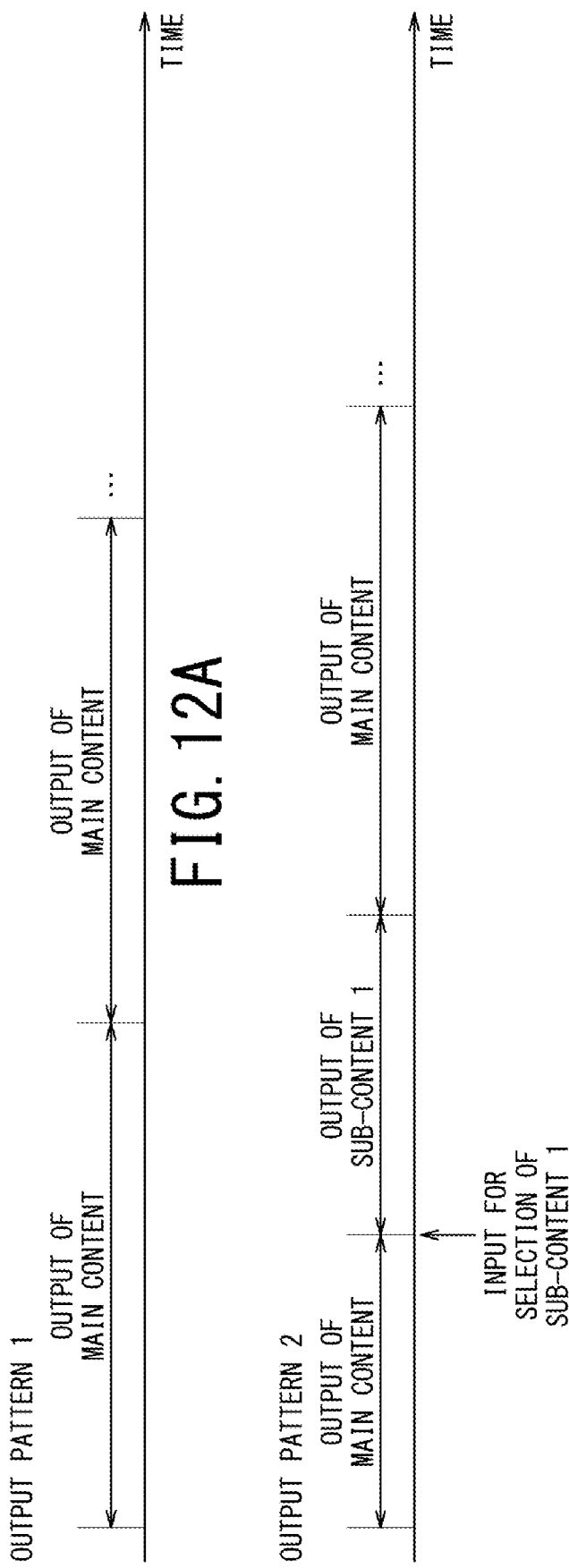

CONTENT DELIVERY SYSTEM AND CONTENT DELIVERY METHOD

TECHNICAL FIELD

The embodiment of the present invention relates to a technique on delivery of content used in sales promotion of commercial products displayed on stores using terminals installed in the vicinity of the commercial products.

BACKGROUND ART

In order to drive customers to buy commercial products, some monitors are installed in the vicinity of the displayed products, and demonstrational edited images on the commercial products for home shopping are displayed on the monitors.

PRIOR ART DOCUMENT

Patent Document

Patent Document 1: Japanese Unexamined Patent Application Publication No. 2001-331137

DESCRIPTION OF INVENTION

Problems to be Solved by Invention

Since a monitor disposed near a commercial product displays only a predetermined demonstrational image, customers cannot obtain required information in some cases. Thus, the customers should put questions to clerks if the customers want to learn more about the commercial products. If no clerk resides adjacent to the customers or if clerks do not have expertise in the commercial products, the requirements of the customers cannot be satisfied on the moment.

An object of the embodiment of the present invention, which has been made under such a circumstance, is to provide a technique for delivering content from which a customer can get, on the spot, necessary information on a commercial product displayed on a store.

Means for Solving Problem

In one embodiment of the present invention, a content delivery system comprising:

a content memory for recording a plurality of content files corresponding to a plurality of information items on one commercial product that is a target of sales promotion;

an output unit for outputting one of the content files;

a touch panel for displaying selective input buttons that correspond to one of the content files on a screen of the touch panel;

an input acceptor for accepting an input operation from one of the selective input buttons; and a selector for selecting a content file among the content files, the selected content file corresponding to the touched selective input button and for outputting the selected content file to the output unit, in response to the touch operation of the selective input button.

In one embodiment of the present invention, the content delivery system, further comprising:

an access unit for accessing a server every predetermined time;

an identifier transmitter for sending identifiers to the server, the identifiers being capable of identifying individual terminals trying to access the server; and a scheduler for receiving schedules corresponding to the transmitted identifiers from the server.

In one embodiment of the present invention, the content delivery system, further comprising:

an access unit for accessing a server;

an identifier transmitter for sending identifiers to the server, the identifiers being capable of identifying individual terminals trying to access the server; and a downloader for downloading one of the content files corresponding to the transmitted identifier from the server and storing the content file in the content memory.

In one embodiment of the present invention, the content delivery system, further comprising:

a download timer for determining whether the current time is within a scheduled download period prior to a scheduled output period during which one of the content files is scheduled to be outputted; and a downloader for downloading at least one of the content files from a server and storing the content file in the content memory in the case where the current time is within the scheduled download period.

In one embodiment of the present invention, the content delivery system, further comprising:

a final output determiner for determining whether the current time is after the scheduled output period during which the content file is scheduled to be outputted; and an eraser for deleting the content file corresponding to the scheduled output period from the content memory in the case where the current time is after the scheduled output period.

In one embodiment of the present invention, the content delivery system, further comprising:

a counter for counting the frequency of selections of the content file corresponding to the touched selective input button in response to the touch operation of the selective input button; and a selected frequency transmitter for sending information capable of identifying the frequency of selections of the content file.

In one embodiment of the present invention, the content delivery system, further comprising:

a selected time memory for storing the time at which the content file corresponding to the selective input button is selected in response to the touch operation of the selective input button; and a selected time transmitter for sending information capable of identifying the time at which the content file is selected.

In one embodiment of the present invention, the content delivery system, further comprising:

a camera for shooting a photograph of persons residing in front of the touch panel;

a face recognizer for analyzing the faces of the persons in the photograph through a facial recognition algorithm to individually identify the persons; and a headcount transmitter for sending information that is capable of determining the number of persons residing in front of the touch panel for a predetermined time or more.

In one embodiment of the present invention, the content delivery system, further comprising:

a display controller for presenting the selective input buttons in a predetermined sequence on the screen of the touch panel;

a counter for counting the frequency of selections of the content file corresponding to the selective input button in response to the input operation of one of the selective input buttons; and a switcher for changing the content file corresponding to each selective input button based on the frequency of selections of the content file.

In one embodiment of the present invention, the content delivery system, further comprising:

a display controller for displaying a main region and the plurality of selective input buttons, the main region displaying the image of the content file, the selective input buttons having an area smaller than the area of the main region on the screen of the touch panel.

In one embodiment of the present invention, the content delivery system, further comprising:

a downloader for downloading the content files on a second commercial product from a server and storing the content files in the content memory within a first scheduled output period during which the content file on a first commercial product is scheduled to be outputted.

In one embodiment of the present invention, the content delivery system, wherein the content files comprise a single main content file and a plurality of sub-content files having a playback time shorter than the playback time of the main content file; and the selector outputs the main content file through the output unit after the sub-content file is outputted through the output unit.

In one embodiment of the present invention, the content delivery system, further comprising:

a plurality of terminals disposed in the vicinity of the commercial product, the terminals outputting the content files; and a server accessible from the terminals through the Internet, the server comprising:

a schedule acceptor for accepting an input operation of a schedule corresponding to each of the terminals;

a schedule memory for storing the accepted schedule in connection with an identifier that is capable of identifying the corresponding terminal;

an identifier receiver for receiving the identifier from each terminal accessed through the Internet; and an authenticator for permitting the terminal to receive the schedule in connection with the identifier.

In one embodiment of the present invention, a content delivery method, comprising:

storing a plurality of content files corresponding to a plurality of information items, respectively, on a commercial product that is a target of sales promotion;

outputting one of the content files through an output unit;

displaying selective input buttons corresponding to one of the content files;

accepting the input operation from one of the selective input buttons; and outputting the content file corresponding to the selective input button from the output unit in response to an input operation of the selective input button.

BRIEF DESCRIPTION OF DRAWINGS

FIG. 9A illustrates a delivery management table; and FIG. 9B illustrates a terminal management table.

FIG. 10A illustrates a content file management table; and FIG. 10B illustrates a message management table.

FIG. 11A illustrates a table of information on the frequency of selections of the content files; and FIG. 11B illustrates a table of information on a viewership.

FIGS. 12A, 12B, and 12C illustrate the relations between the selection input operation and the output pattern of the content file.

MODES FOR EMBODYING INVENTION

Figure 1:
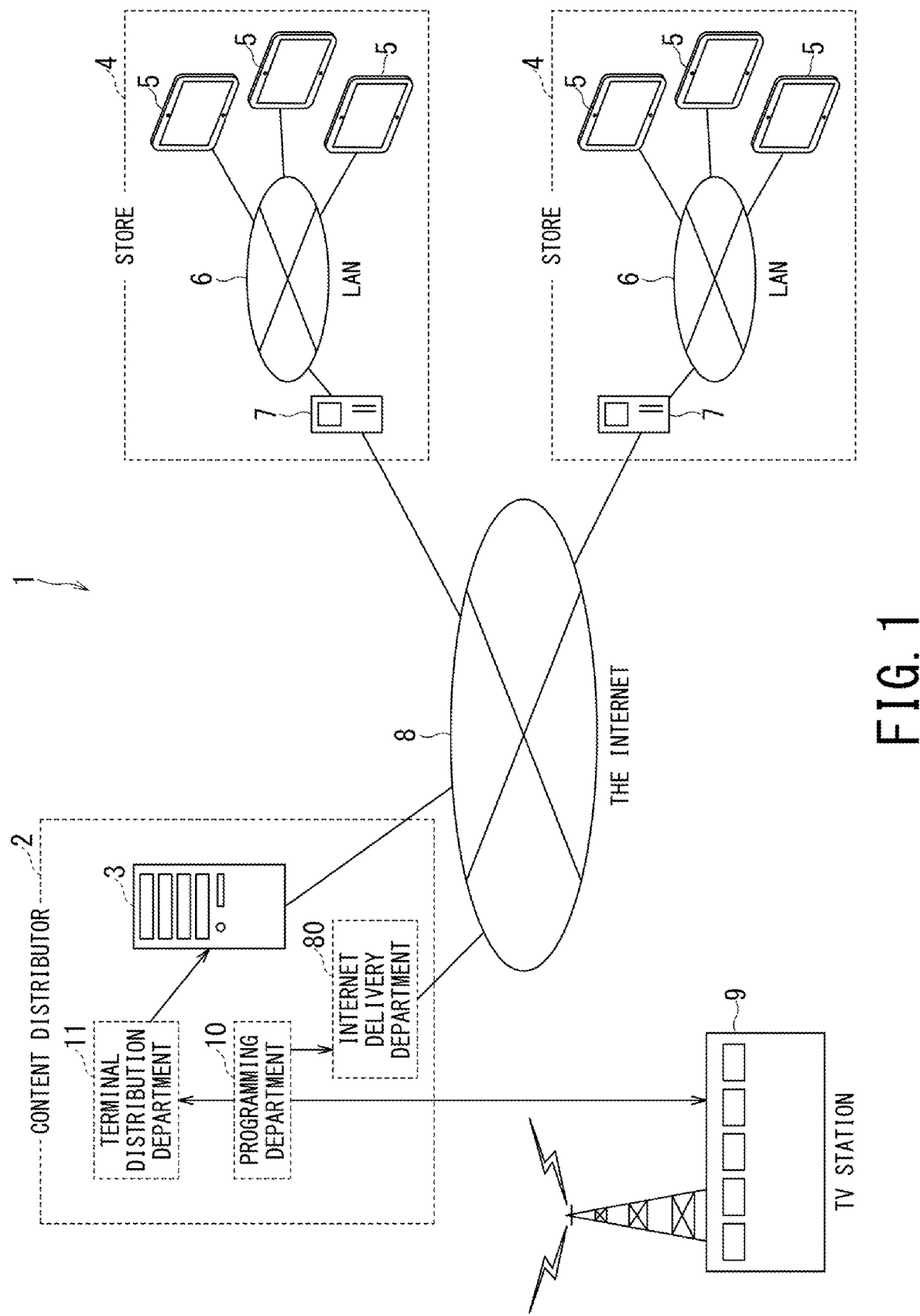
FIG. 1 illustrates an overall configuration of a content delivery system.

The content delivery system of an embodiment will now be described with reference to FIGS. 1 to 20. In FIG. 1, reference numeral 1 denotes a content delivery system. The content delivery system 1 includes a management server 3 disposed in a content distributor 2 and store terminals 5 disposed in stores 4. The store terminals 5 in this embodiment are of tablet types. In the following description, the content distributor 2 has ownership rights of the store terminals 5 and the copyright of content to be delivered.

With reference to FIG. 1, one or more stores 4 provided with store terminals 5 are located distant from the content distributor 2. Each store 4 may be provided with one or more store terminals 5. Each store terminal 5 is connected to a LAN 6 in the corresponding store 4. The LAN 6 of each store 4 is connected to the Internet 8 through a router 7 having a fire wall function. The LAN 6 deployed in the store 4 may be a wired or wireless LAN. Alternatively, the wired LAN may be connected to a wireless router that is connected to the store terminal 5.

The management server 3 is also connected to the Internet 8. In other words, the store terminal 5 can be connected to the management server 3 through the Internet 8. The management server 3 has a prefixed IP address. The IP address of the management server 3 is preliminarily stored in each store terminal 5, and the store terminal 5 can access the management server 3 at any time. Although the store terminal 5 accesses the management server 3 in this embodiment, the management server 3 need not access the store terminal 5. The management server 3 accumulates content files generated at one store terminal 5 and distributes them to each store terminal 5 through the Internet 8. Here, in this Specification, the content file mean not only content expressed in a file format but also content of various concepts.

The content files outputted from store terminals 5 may each contain a video image, a still image, voice, textual information, or combination thereof. The video image in this embodiment includes voice associated with the video image. In detail, display or output of a video image is accompanied by output of voice.

In this embodiment, each store terminal 5 accesses the management server 3 every constant time, for example, every five minutes. The store terminal 5 acquires a corresponding schedule every constant access operation. The schedule in this embodiment includes a scheduled download period for download of a content file from the management server 3 through the store terminal 5, a scheduled output period for output of the downloaded content file from the store terminal 5, and the start time and the stop time of the store terminal 5. The schedule may further include any other item.

The schedule allows the operation of the store terminal 5 to be controlled. In other words, the schedule retrieved from the management server 3 includes information (commands) on the control of the store terminal 5. The schedule may correspond to individual store terminals 5, to individual stores, or to individual groups of the stores.

The store terminals 5 are each automatically activated at a start time that is set by the schedule retrieved from the management server 3. During the scheduled download period, the store terminal 5 downloads the corresponding content file. During the scheduled output period, the schedule store terminal 5 outputs the corresponding content file. The store terminal 5 shuts down automatically at the time of shut-down. In such a manner, the content distributor 2 controls the operations of each store terminal 5. Clarks in each store 4 have no need for the control of the store terminals 5. After an employee of the content distributor 2 installs one or more store terminals 5 in each store 4, content files can be automatically distributed without any operation of the clerks of the store 4.

The content distributor 2 includes a programming department 10 that produces programs for home shopping (TV home shopping) through a TV station 9, a terminal distribution department 11 that distributes the programs after re-editing to individual store terminals 5, and an Internet delivery department 80 that distributes the programs through the Internet 8. In the embodiment, the content files of video images are re-edited before distribution such that the programs for home shopping can be available in store terminals 5.

The home shopping, which is one of the online shopping systems, introduces commercial products 12 (see FIG. 5) being targets of sales promotion through television broadcasting and takes orders from viewers via telephone calls. Customers can conveniently get commercial products 12 without leaving home. Since the commercial products 12 promoted by home shopping is expected to increase sales, each store 4 will also start selling the commercial products 12.

A customer may want to know more about a commercial product 12 that is displayed. If the clerk in the store 4 lacks knowledge on commercial products in such a case, the customer cannot get further useful information from the clerk through conversation with the clerk. In the conventional systems, it is difficult for the customer to get the abundant information, which is available from home shopping programs, at the store. In contrast, the customer can get detailed information on the commercial product 12 through the store terminal 5 of the embodiment installed in the store 4.

In this embodiment, the terminal distribution department 11 produces and distributes content files of commercial products 12 to stores to answer clients' questions on the commercial products 12. The Internet delivery department 80 exclusively produces and distributes content files for Internet delivery.

The terminal distribution department 11 distributes the content files to store terminals 5 installed in stores 4, whereas the Internet delivery department 80 distributes the content files to terminals, such as personal computers, other than the store terminals 5. The Internet delivery department 80 may distribute the content files through its own WEB server (not shown) or another firm's WEB server (not shown). The terminals to which the Internet delivery department 80 distributes the content files may be installed in stores 4 or common homes. Prior to delivery, the Internet delivery department 80 preliminarily notify users who have contracted with the content distributor 2 of credentials, such as passwords. Upon request for access from users, authentication is performed using the credentials to permit content files to be distributed to only authorized users.

Figure 5:
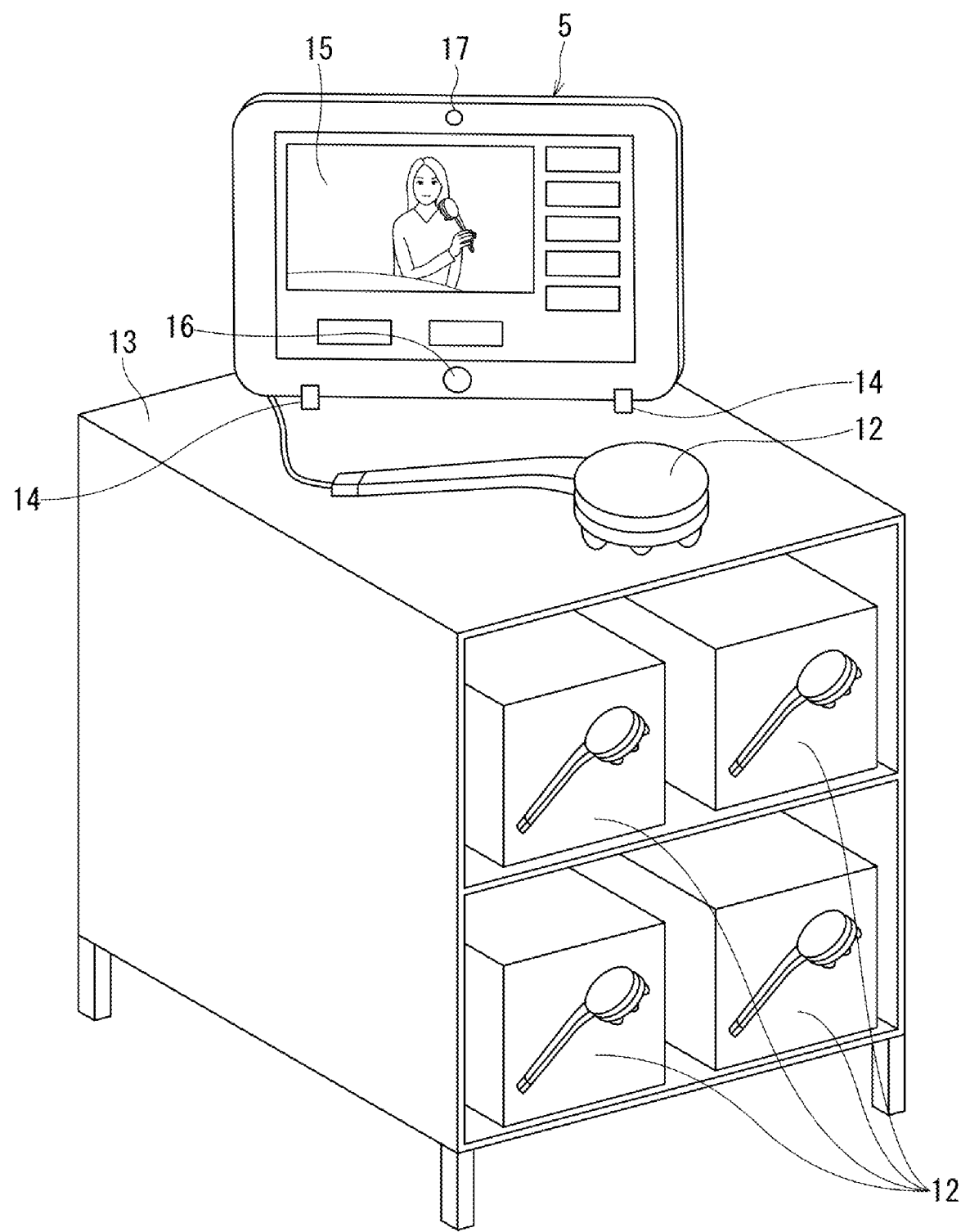
FIG. 5 is an isometric view illustrating the store terminal placed in a store.

With reference to FIG. 5, the store terminal 5 is installed in the vicinity of the commercial products 12 placed on a given display stand 13. For example, the commercial products 12 accommodated in presentation boxes are placed on the shelfs of the display stand 13. A sample of the commercial products 12 and the store terminal 5 are disposed on the top face of the display stand 13. A customer who wants to buy the commercial product 12 brings the commercial product 12 accommodated in the presentation box to the checkout counter. The store terminal 5 is held in an upright posture with a given retainer 14. The customer can touch the screen of the touch panel 15 of the store terminal 5 for touch interactions.

Although the store terminal 5 has a main switch 16 on its front face, the input operation of the main switch 16 is normally set to be inactive. The functions of devices, such as USB connectors (not shown), unrelated to the output of the content file are also set to be inactive. In order to awake these locked functions, a release code determined by the content distributor 2 should be inputted.

Such a system can prevent unintentional operations of the store terminal 5 and unfair copying of the content files stored in the store terminal 5. The store terminal 5 includes a camera 17 on the front face for photographing a person residing in front of the touch panel 15. The camera 17 is also used for constant monitoring. The store terminal 5 in combination with the constant monitoring can prevent criminal acts such as shoplifting of the commercial products 12. The store terminal 5 may be provided with a GPS receiver to observe the position of the commercial products 12.

Popularly practiced conventional means is to install a monitor beside commercial products and to display a video image that illustrates the commercial products. Distribution of video images through the Internet has also been popularly practiced. In contrast, the store terminal 5 in this embodiment can timely presents information that meets the needs of a customer in front of the monitor and rapidly and satisfactorily answer a question posed by a customer, and thus this system is quite different from a technique that merely playbacks a video image for illustration. Consequently, the content delivery system 1 of this embodiment includes ensemble technology consisting of many original techniques, not mere a monitoring technique of images.

Figure 6:
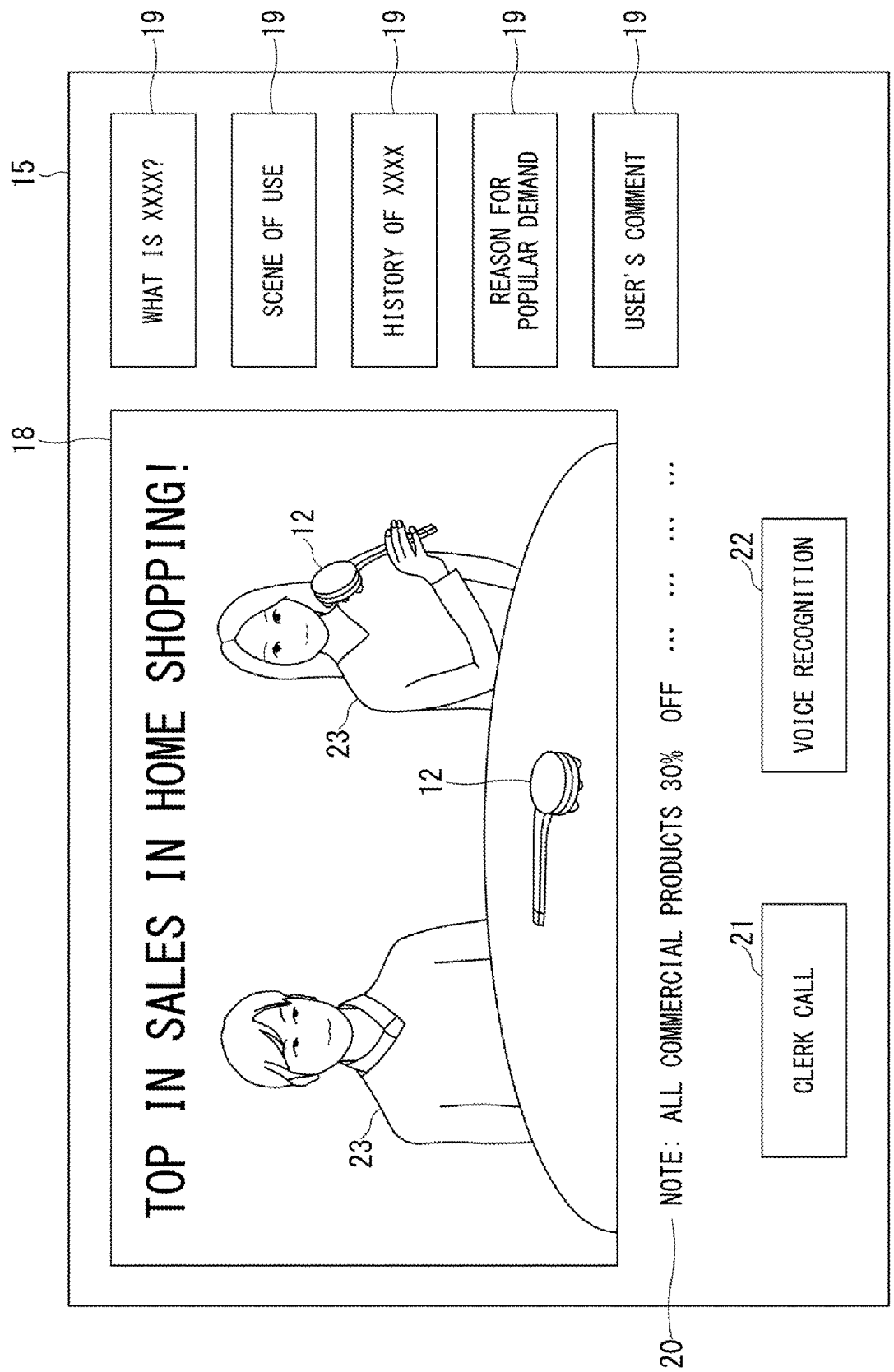
FIG. 6 illustrates a screen of the store terminal that outputs content.

With reference to FIG. 6, a main region 18 (output portion) that displays the image of a content file and five selective input buttons 19 having a smaller area than that of the main region 18 appear on the screen of the touch panel 15. In this embodiment, these selective input button 19 are vertically disposed on the right of the screen. The main region 18 is disposed on the left of the selective input button 19. A message display area 20 presenting a message resides below the main region 18. Furthermore, a clerk call button 21 and a voice recognition button 22 are disposed below the message display area 20.

The main region 18 displays the image of one of the content files stored in the store terminal 5. In the embodiment, multiple content files are produced for one commercial product 12 that is a target of sales promotion. Each content file consists of a main content file and a plurality of sub-content files having a playback time shorter than that of the main content file. For example, the main content file contains a video image that requires a playback time of about 30 minutes, like home shopping. In contrast, each sub-content file contains a short video image that introduces the commercial product 12 in detail and requires a playback time of about three minutes.

In the following description, multiple content files corresponding to one commercial product 12 may be referred to as a group of content files. One store terminal 5 stores two or more groups of content files that correspond to multiple commercial products 12. These groups of content files are retrieved from the management server 3 according to the scheduled download period and outputted or play backed through the store terminal 5 according to the scheduled output period. These groups of content files are retrieved or outputted at different periods. In detail, the scheduled download periods corresponding to the groups of content files do not overlap with each other and the scheduled output periods also do not overlap with each other.

The selective input buttons 19 on the touch panel 15 can be operated by a customer, and be used for selection of the content file to appear on the main region 18. If a customer wants to view a "scene of use" of the product while a main content file appears on the main region 18, the customer touches the second top selective input button 19 corresponding to "the scene of use" in FIG. 6. The video image of the sub-content file corresponding to the "scene of use" then appears on the main region 18.

The frequency (number) of the selections of each sub-content file by the customer is counted. The sub-content files are sorted in descending order of the frequency of selections. For example, the five selective input buttons 19 are sorted in descending order of the frequency of selections from the top. In other words, the topmost selective input button among the vertically disposed selective input buttons 19 corresponds to the content file having a frequency of selections. In more detail, although the topmost selective input button 19 corresponds to "What is . . . ?" in the initial display mode, the topmost selective input button 19 is replaced with the "scene of use" if the frequency of selections of the "scene of use" is higher than the frequencies of the other items. Since the sub-content file of particular interest to customers has a higher frequency of selections in such a way, the rearrangement of the sub-content files in response to the frequency of selections corresponding to each selective input button 19 facilitates the input operations by customers.

In the embodiment, each selective input button 19 is in the form of a character string (text data). Alternatively, the selective input button 19 may be in the form of a partial image of a video image of the sub-content file. Alternatively, the selective input button 19 may be in the form of a video image in addition to the still image.

The store terminal 5 transmits aggregated information on customer attitudes of the store 4 to the management server 3 periodically, for example, every five minutes. The aggregated information includes, for example, the frequency of selections of each sub-content file, the selected time, the viewership of each content file, and the viewing time.

In the embodiment, the selective input buttons 19 are vertically disposed. Alternatively, the selective input buttons 19 may be horizontally disposed. Although five selective input buttons 19 are exemplified, the minimum required number is one. Six or more selective input buttons 19 are also allowable. The number of the selective input buttons 19 may be the same as the number of the sub-content files. Alternatively, the number of the sub-content files may be greater than the number of the selective input buttons 19.

Figure 7:
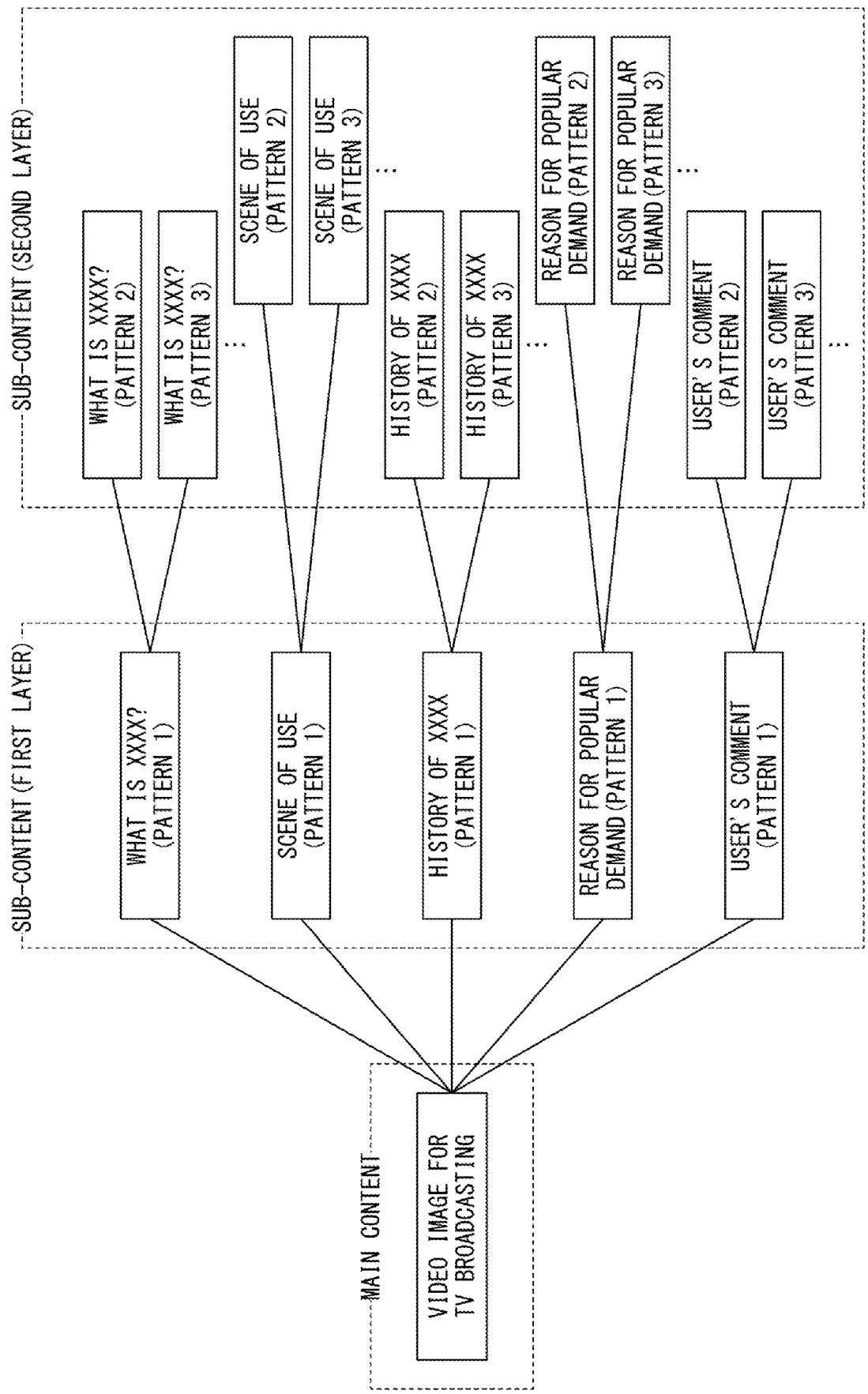
FIG. 7 illustrates the configuration of the content file.

With reference to FIG. 7, the number of the produced sub-content files is greater than the number of the selective input buttons 19 in the embodiment. These sub-content files correspond to the information items, respectively, on one commercial product 12. The sub-content files are categorized into first-layer sub-content files that are identical in number to the selective input buttons 19 and second-layer sub-content files belonging to each first-layer sub-content files. One commercial product 12 corresponds to a single main content file.

The type of each first-layer sub-content file corresponds to the type of the second-layer sub-content files. For example, if the first-layer sub-content file relates to "scene of use (pattern 1)", the second-layer sub-content files relates to "scene of use (pattern 2)", "scene of use (pattern 3)", and so on. In other words, a variety of versions of one scene of use are preliminarily produced, for example, a version of a different cast member 23 (see FIG. 6) and a version of a different situation.

The first-layer sub-content files correspond to the selective input buttons 19, respectively, at initial display. When any one of the first-layer sub-content files is selected, second-layer sub-content files corresponding to the type of the selected sub-content file correspond to the selective input buttons 19. For example, if "scene of use (pattern 1)" is selected from the five selective input buttons 19 at initial display, the display of these five selective input buttons 19 are modified to "scene of use (pattern 2)" and "scene of use (pattern 3)" and so on. The user can thereby select any scene of use.

When the customer selects one of the sub-content files, the correspondence between other sub-content files and the selective input buttons 19 may be modified. If "scene of use (pattern 1)" is selected, for example, "users' comment (pattern 1)", "users' comment (pattern 2)", or "reason for popular demand (pattern 2)" may be correlated to a selective input button 19.

Alternatively, individual sub-content files may be correlated to selective input buttons 19 at random. The store terminal 5 may learn the pattern of selections of sub-content files by customers to change the sub-content file correlated to the selective input button 19 in response to the results of the learning. The sub-content files may be sorted according to the results of the learning. In other words, the store terminal 5 may include a machine learning unit that changes and/or sorts the sub-content files.

With reference to FIG. 6, the voice recognition button 22 allows a customer to select a sub-content file by voice with no operation of the selective input buttons 19. The customer touches the voice recognition button 22, and then says "I want to see the "scene of use". The microphone 38 (see FIG. 2) picks up the voice and guides the same operation when the selective input button 19 corresponding to the "scene of use" is performed. In summary, the selective input button of the embodiment may be any form other than the selective buttons appearing on the screen of the touch panel 15, for example, a process based on the voice of the customer inputted through the microphone 38.

If the first-layer sub-content file corresponds to a selective input button 19 at the initial display, a second-layer sub-content file not corresponding to the selective input button 19 may be called by voice recognition.

The customer can make any inquiry by voice. For example, the store terminal 5 preliminarily learns voice patterns corresponding to a variety of questions to select an appropriate sub-content file with reference to the learning outcome. Any requirement not corresponding to the type of the sub-content file can also be acceptable by voice recognition. For example, the customer says "I want to see a scene where Mr. X appears" for viewing a scene of a certain cast member 23, and then a sub-content file including the cast member 23 is retrieved.

A voice recognizer 58 (see FIG. 3) of the store terminal 5 analyzes the voice of the customer collected through the microphone 38, based on a voice recognition algorithm.

The voice recognizer 58 may be provided with secretarial application software that functions as a speech analyzer and a recognition interface. This software answers a question from the customer through a natural language process. For example, the customer orally asks "What colors are available?"; then, the voice recognizer 58 analyzes the question and answers "red, white, and black are available" by audio output. The voice recognizer 58 can also identify the language, for example, Japanese, English, or Chinese, spoken by the customer to make an answer of the identified language.

The customer operates the clerk call button 21 for call of a clerk of the store 4. When the customer touches the clerk call button 21, the touch operation is sent to a mobile terminal (not shown) owned by the clerk through the LAN 6 from the store terminal 5. The notified clerk goes to the display stand of the commercial products 12 to serve the customer. Alternatively, the touch operation of the clerk call button 21 may be transmitted to a management computer in the store 4 through the store terminal 5. Alternatively, the store terminal 5 may output an alarm for calling the clerk.

The message display area 20 displays the sentence or text data to inform the customer. The data to appear on the message display area 20 can be inputted through the management server 3. The information downloaded from the management server 3 includes data that can identify the data to appear on the message display area 20.

In this embodiment, the touch panel 15 can display the content file on the main region 18 and the selective input buttons 19 related to any other content at the same time; hence, the customer can readily select any other content file through an input operation.

The system configurations of the management server 3 and the store terminal 5 will now be described with reference to the block diagrams shown in FIGS. 2 to 4. Since these configurations are typical examples, the management server 3 and the store terminal 5 may further include any other element.

The management server 3 and the store terminal 5 of the embodiment each include a computer including hardware resources, such as a CPU, a ROM, a RAM, and an HDD (or a non-volatile memory), where the CPU performs information processing operations under instruction of software. The computer can distribute the content files through a delivery program for the content files.

Figure 2:
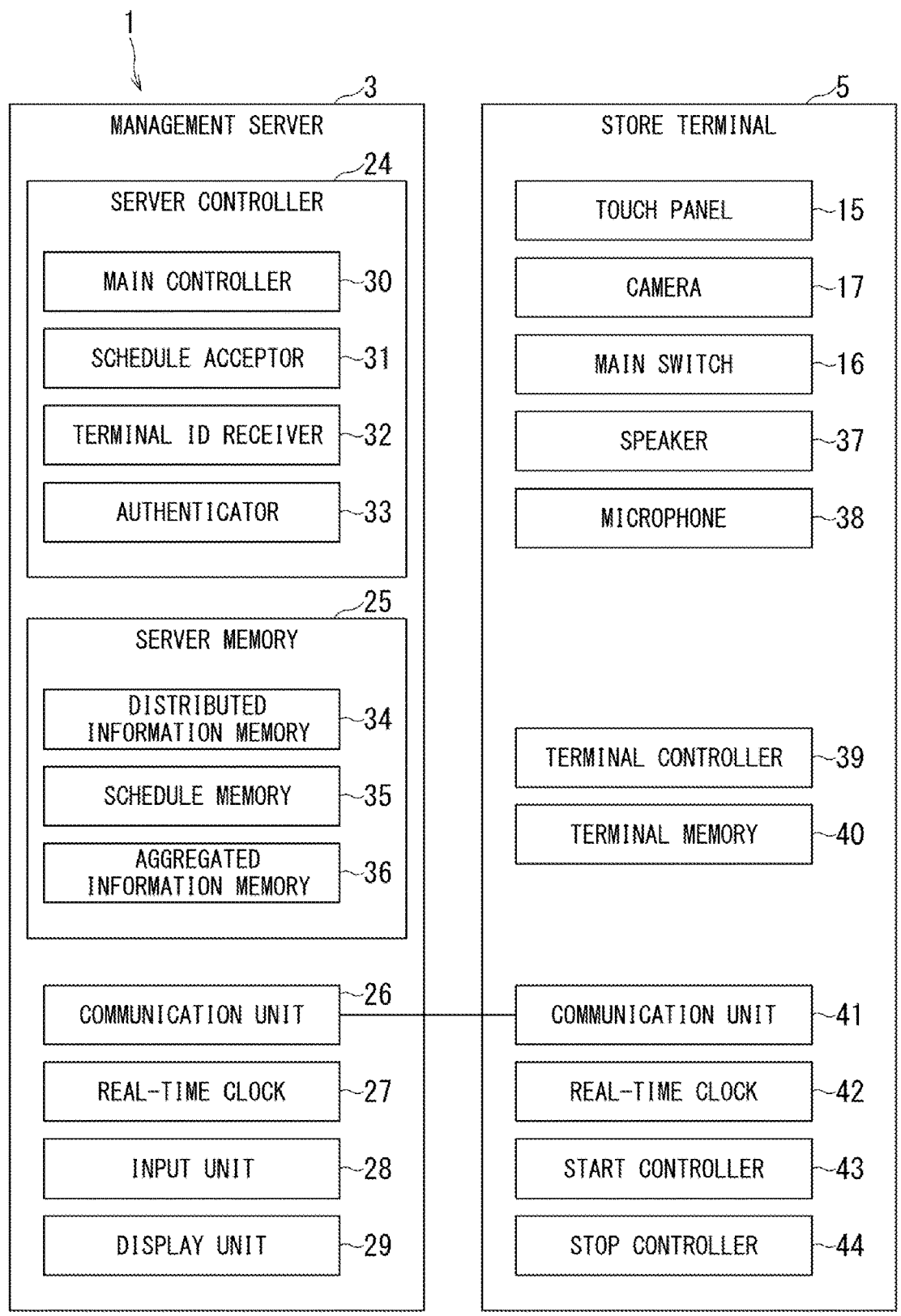
FIG. 2 is a block diagram illustrating system configurations of a management server and a store terminal.

With reference to FIG. 2, the management server 3 includes a server controller 24 that controls the overall operations of the management server 3, a server memory 25 that stores several information items, such as content files to be distributed to terminals and the schedule of the store terminal 5, a communication unit 26 for communication with store terminals 5 through the Internet 8, a real-time clock 27 to retrieve the current time, an input unit 28 for input operations on a variety of information items by an administrator, and a display unit 29 that outputs a variety of information items.

The server controller 24 may consist of a CPU, for example. The server memory 25 may consist of an HDD, for example. The input unit 28 may consist of a keyboard and a mouse, for example. The display unit 29 may consist of a display panel, for example.

The server controller 24 includes a main controller 30 for main control operations, a schedule acceptor 31 that accepts input operations for scheduling corresponding to individual store terminals 5, a terminal ID receiver 32 for receiving terminal identifiers (IDs) that can identify the individual store terminals 5 connected through the Internet 8, and an authenticator 33 for authentication of the terminal IDs.

The server memory 25 includes a distributed information memory 34 that stores delivery information, such as content files and messages for delivery to terminals, a schedule memory 35 that stores schedules correlated to individual terminal IDs, and an aggregated information memory 36 that stores aggregated information received from store terminals 5.

With reference to FIG. 2, the store terminal 5 includes a touch panel 15 (output unit) that accepts the display of a content file and an input operation, a camera 17 for taking a photograph of a person facing the touch panel 15, a speaker 37 (output unit) outputting voice information on the content file, a microphone 38 collecting voice information, a terminal controller 39 for controlling the store terminal 5, a terminal memory 40 that stores a variety of information items such as content files and schedules, a communication unit 41 (access unit) for periodical communication to the management server 3 through the Internet 8, and a real-time clock 42 for retrieval of the current time, a start controller 43 for controlling the start of the store terminal 5, and a stop controller 44 for controlling the stop of the store terminal 5.

The authenticator 33 authenticates such that the store terminal 5 can retrieve the schedule and the content file that are correlated to the terminal identifier (ID). The store terminal 5 authenticated by the authenticator 33 can retrieve the schedule and the content file correlated to the terminal ID from the management server 3. In contrast, a store terminal 5 not authenticated by the authenticator 33 is disconnected from the management server 3. Since only communication from the store terminal 5 to the management server 3 is carried out in this embodiment, the management server 3 can control the schedule of the store terminal 5 even if the store terminal 5 is disposed in the LAN 6 in the store 4.

The terminal controller 39 consists of a CPU, for example. The terminal memory 40 consists of a nonvolatile memory, for example. The start controller 43 involves control by a basic input/output system (BIOS). The stop controller 44 involves control by an operating system (OS).

The real-time clocks (RTCs) 27 and 42 output time information indicating the current time and calendar information indicating the date and day of the week. The real-time clocks 27 and 42 may output an accumulated run time from the start of power-on to the current time. The real-time clocks 27 and 42 further may include a timer function that determine the time from the start of a given operation to the end of this operation.

The output unit of the embodiment of this embodiment includes both the speaker 37 outputting voice and a touch panel 15 displaying an image on the content file (image appearing on the main region 18). Alternatively, the output unit may be either the speaker 37 or the touch panel 15.

The speaker 37 may be a directional speaker that emits voice toward a limited range of direction. The directional speaker enables only a customer facing the store terminal 5 to hear the voice for explaining the commercial product, in order not to give someone near the store terminal 5 trouble.

Figure 3:
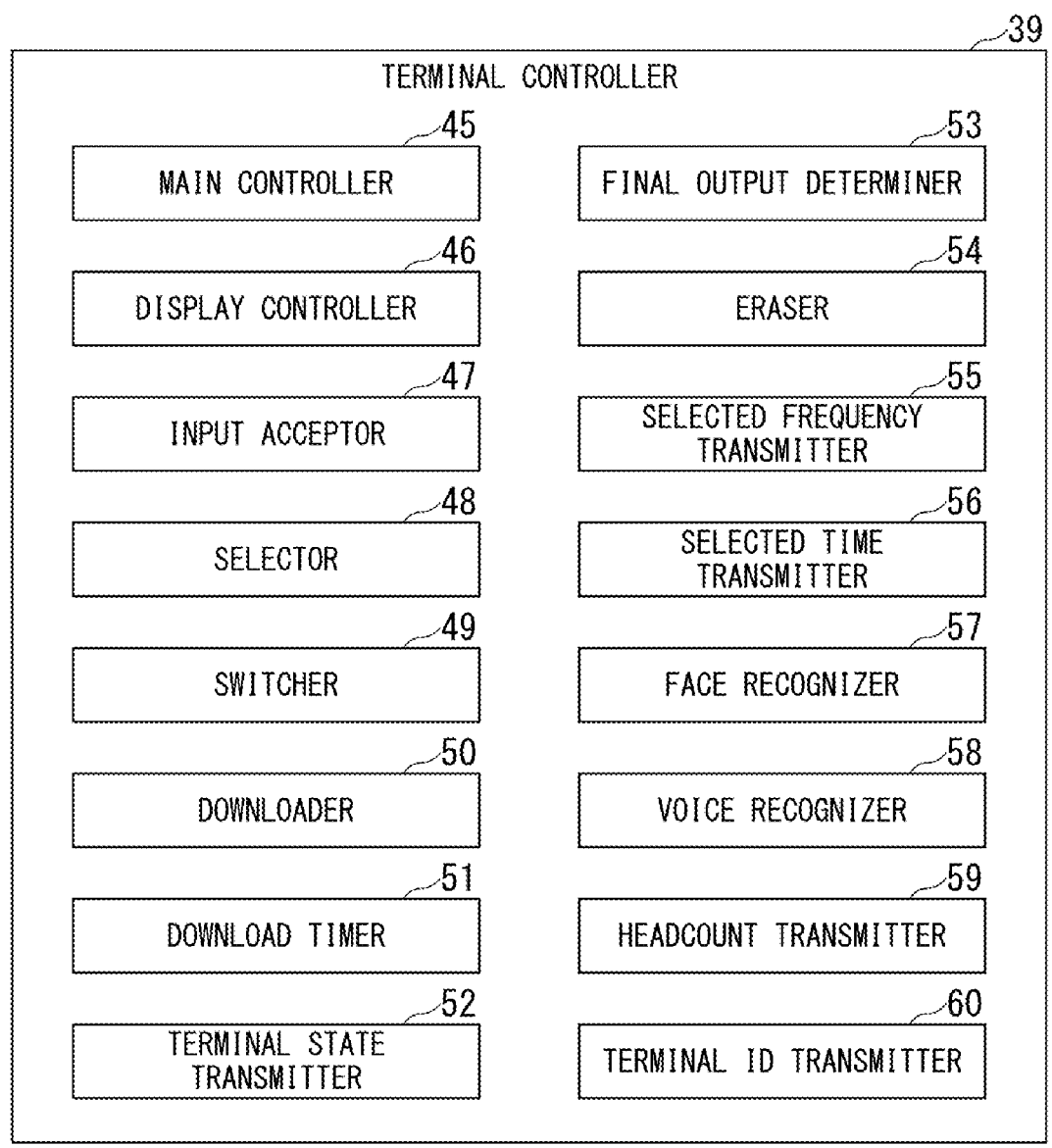
FIG. 3 is a block diagram illustrating a system configuration of a terminal controller of a store terminal.

With reference to FIG. 3, the terminal controller 39 includes a main controller 45 that performs main control, a display controller 46 that controls display of an image on the screen of the touch panel 15, an input acceptor 47 that receives an input operation of each selective input button 19 through the touch panel 15, a selector 48 that selectively outputs a content file corresponding to the selective input button 19 in response to an input operation of the selective input button 19, a switcher 49 that switches the content file corresponding to the selective input button 19 based on the frequency of selections, a downloader 50 that retrieves the content file from the management server 3 to store the file onto a terminal memory 40, a download timer 51 that determines whether the current time (date) is within the scheduled download period, and a terminal state transmitter 52 that sends the operational state of the store terminal 5 to the management server 3.

The terminal controller 39 further includes a final output determiner 53 that determines whether the current time (date) is after scheduled output period during which the content file is scheduled to be outputted, an eraser 54 that deletes the finished content file from the terminal memory 40, a selected frequency transmitter 55 that sends aggregated information capable of determining the frequency of selections of each content file to the management server 3, a selected time transmitter 56 that sends aggregated information capable of determining the frequency of selections of each content file to the management server 3, and a face recognizer 57 that analyzes the face of person captured by the camera 17 to distinguish the person from other persons, based on a facial recognition algorithm.

Furthermore, the terminal controller 39 includes a voice recognizer 58 that analyzes the voice of the customer captured through the microphone 38 based on a voice recognition algorithm to confirm the questionnaires, a headcount transmitter 59 that counts of the number of the customers staying in front of the touch panel 15 for a predetermined time or more based on the information analyzed at the face recognizer 57 of the image captured at the camera 17 and sends the aggregated information to the management server 3, and a terminal ID transmitter 60 (identifier transmitter) that sends a terminal ID for accessing the management server 3.

The terminal ID (identifier) sent from the terminal ID transmitter 60 to the management server 3 is a unique physical address (terminal number) that is assigned to the hardware. The terminal ID may be information separately assigned to the software to be installed in the store terminal 5 or the information stored in a USB dongle.

The terminal ID transmitter 60 may send state information that indicates the operational state of the sore terminal 5 together with the transmission of the terminal ID to the management server 3. For example, information on a normal or abnormal operation or information indicating an ongoing download operation of the content file may be sent to the management server 3. The management server 3 can confirm the operational state of each store terminal 5 based on the operational information retrieved from the store terminal 5.

The display controller 46 controls a display operation of at least the main region 18 and he selective input buttons 19 on the screen of the touch panel 15. The display controller 46 displays these selective input buttons 19 in a predetermined sequence on the screen of the touch panel 15.

The face recognizer 57 picks up faces of persons from a visible-light image taken with the camera 17 and individually identifies these persons by a known facial recognition algorithm. The face recognizer 57 may be an integrated circuit (IC) dedicated to face recognition. Alternatively, the face recognizer 57 may be a high-performance microcomputer including a program of the facial recognition algorithm.

Figure 4:
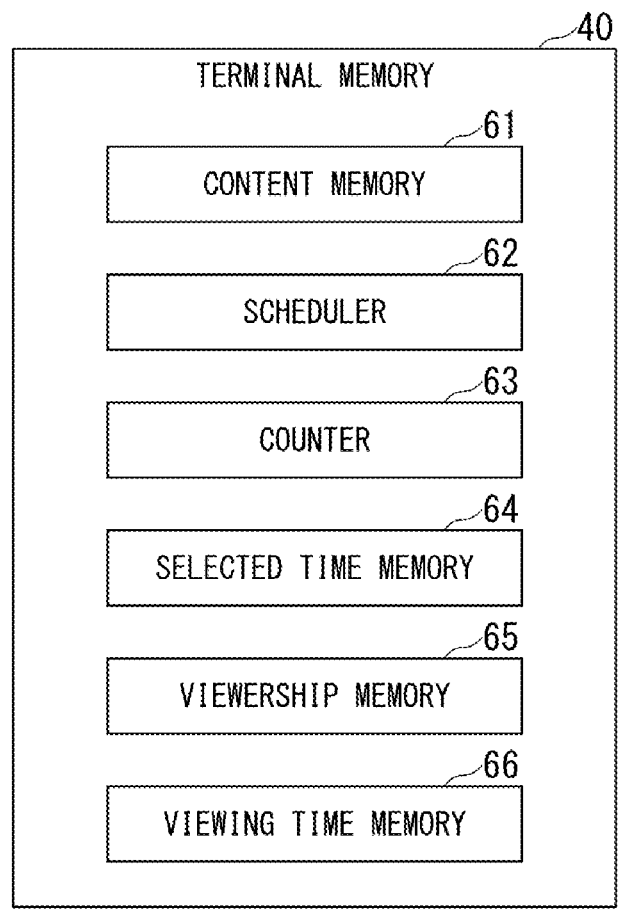
FIG. 4 is a block diagram illustrating a system configuration of a terminal memory of the store terminal.

With reference to FIG. 4, the terminal memory 40 includes a content memory 61 that stores a plurality of content files corresponding to the respective information items on a commercial product being a target of sales promotion, a scheduler 62 that retrieves a schedule correlated to the terminal ID from the management server 3, a counter 63 that counts the frequency of the selection of the content file corresponding to the selective input button 19 upon the input operation of the selective input button 19, a selected time memory 64 that stores the time when the content file corresponding to the selective input button 19 is selected in response to the input operation of the selective input button 19, a viewership memory 65 that stores the number of the customers who have accessed the content files outputted on the touch panel 15, and a viewing time memory 66 that stores the times when each customer viewed the content file.

The scheduler 62 manages the schedule inputted by an administrator who administrates the management server 3. The store terminal 5 accesses the management server 3 every predetermined time, and accepts the schedule corresponding to the store terminal 5, if updated, and then transmits the schedule to the scheduler 62. Such a configuration enables the management server 3 to control the schedule of the store terminal 5 even if the store terminal 5 is provided in the LAN 6 of the store 4. The clerk of the store 4 having the store terminal 5 needs not the operation of the store terminal 5 for the scheduling. Furthermore, the management server 3 can comprehensively update the schedules without operations of individual store terminals placed on stores 4.

In this embodiment, multiple store terminals 5 can be managed every store or every group of stores. The schedule can also be updated every store or every group of stores. Updating of schedule every store indicates that schedules of multiple store terminals 5 in one store 4 are updated at the same time. The group can be determined, for example, on a regional scale, such as a Kanto district and a Kansai district, for every prefecture, or every commercial product. The updating of schedule every group indicates that the schedules of multiple store terminals 5 in one group are updated at the same time.

The counter 63 adds the frequency of selections of the sub-content file corresponding to the selective input button 19 to the current frequency in response to the touch operations of the selective input button 19. The selected time memory 64 stores the time (for example, every five minutes) when this operation is selected. Alternatively, the counter 63 may store the frequency of selections in connection with the times of selections. Alternatively, individual customers who have performed touch operations through the face recognizer 57 may be identified, and the information on the customers and the frequency of selections of the sub-content file may be stored in the counter 63.

The most frequently selected sub-content file can be determined in such a manner. The most frequently asked question corresponding to the sub-content file can also be determined.

The aggregated information including the frequency of selections and the selected time is sent to the management server 3 through the selected frequency transmitter 55 every time the store terminal 5 access the management server 3. Since the frequency of selections of each content file can be retrieved from the management server 3, the content files of interest to customers can be determined. The management server 3 can also determine the selected time of each content file. For example, the selected time of the content file retrieved from the store terminal 5 is checked against the point of sale information retrieved from a point-of-sale (POS) system to correlate the viewing of the content file with the actual buying behavior.

The store terminal 5 sends aggregated information including the frequency of selections every predetermined time in this embodiment. Alternatively, the store terminal 5 may send the frequency of selections in response to every selection of the content file. In detail, the store terminal 5 may be always connected to the management server 3, the information on the connection of the content file is sent to the management server 3 whenever the content file is selected.

In this embodiment, the face recognizer 57 can identify individual customers who have accessed the content file outputted from the store terminal 5 and counts the number of particular persons who have accessed the content file. For example, persons who face the touch panel 15 for a predetermined time (for example, 30 seconds) are regarded as customers who have accessed the content file (customers of interest to the commercial products 12) and the number of the persons is counted. The viewership memory 65 stores the number of persons. The viewing time memory 66 stores the viewing time (for example, every five minutes) at the same time. Alternatively, the viewership memory 65 may store the viewership in correlation with the viewing time.

The face recognizer 57 can analyze the gender, race, age, expression or feeling, viewing habit, and viewing time of each customer. The viewership may be stored in the viewership memory 65 in the form of information in correlation with the gender or age. The information is stored in the viewership memory 65 in correlation with the content file. The information may be stored in correlation with each of the content files. The most frequently viewed content file among the content files outputted from the store terminal 5 can be determined. Furthermore, data on customers' interest in the commercial product 12 corresponding to the content file can be accumulated.

The aggregated information including the viewership is sent to the management server 3 through the headcount transmitter 59 every time the store terminal 5 access the management server 3. The management server 3 can determine the number of viewers who have accessed the content file in such a manner. The store terminal 5 of the content delivery system 1 can be used as a marketing tool for the commercial product 12 that is a target of sales promotion.

The operation of the store terminal 5 will now be explained with reference to FIG. 12(A). If a main content file is outputted on the main region 18 and through the speaker 37 of the store terminal 5 without any operation of the store terminal 5, the main content file is re-outputted after the end of the output of the main content file. In summary, the main content file is repeatedly play backed.

The selector 48 of the store terminal 5 in this embodiment switches the output of the sub-content file to a main content file on the main region 18 and from the speaker 37, after output of a sub-content file on the main region 18 and from the speaker 37. If no one operates the touch panel 15 during the output of the sub-content file, the main content file is automatically outputted, resulting in continuous sales promotion of the commercial product 12. If the sub-content file has a short playback time and contains information on the detail of the commercial product, customers can obtain necessary information for a short time, resulting in an improved turnover ratio of commercial products.

With reference to FIG. 12(B), when the customer operates a selective input button 19 during output of the main content file on the main region 18 and from the speaker 37 of the store terminal 5; the output of the main content file is discontinued and the sub-content file 1 corresponding to the touched selective input button 19 is outputted. After the sub-content file 1 is outputted, the main content file is re-outputted. The main content file may be re-outputted from the leading end or from the discontinued output point of the main content file.

With reference to FIG. 12(C), when a customer touches one of the selective input buttons 19 during output of the main content file on the main region 18 and from the speaker 37 of the store terminal 5, the output of the main content file is discontinued and the sub-content file 1 corresponding to the touched selective input button 19 is outputted. If the customer touches one of the selective input buttons 19 during the output of the sub-content file 1, the output of the sub-content file 1 is discontinued whereas the sub-content file 2 corresponding to the touched selective input button 19 is outputted. After the output of the sub-content file 2 is completed, the main content file is re-outputted.

Figure 13:
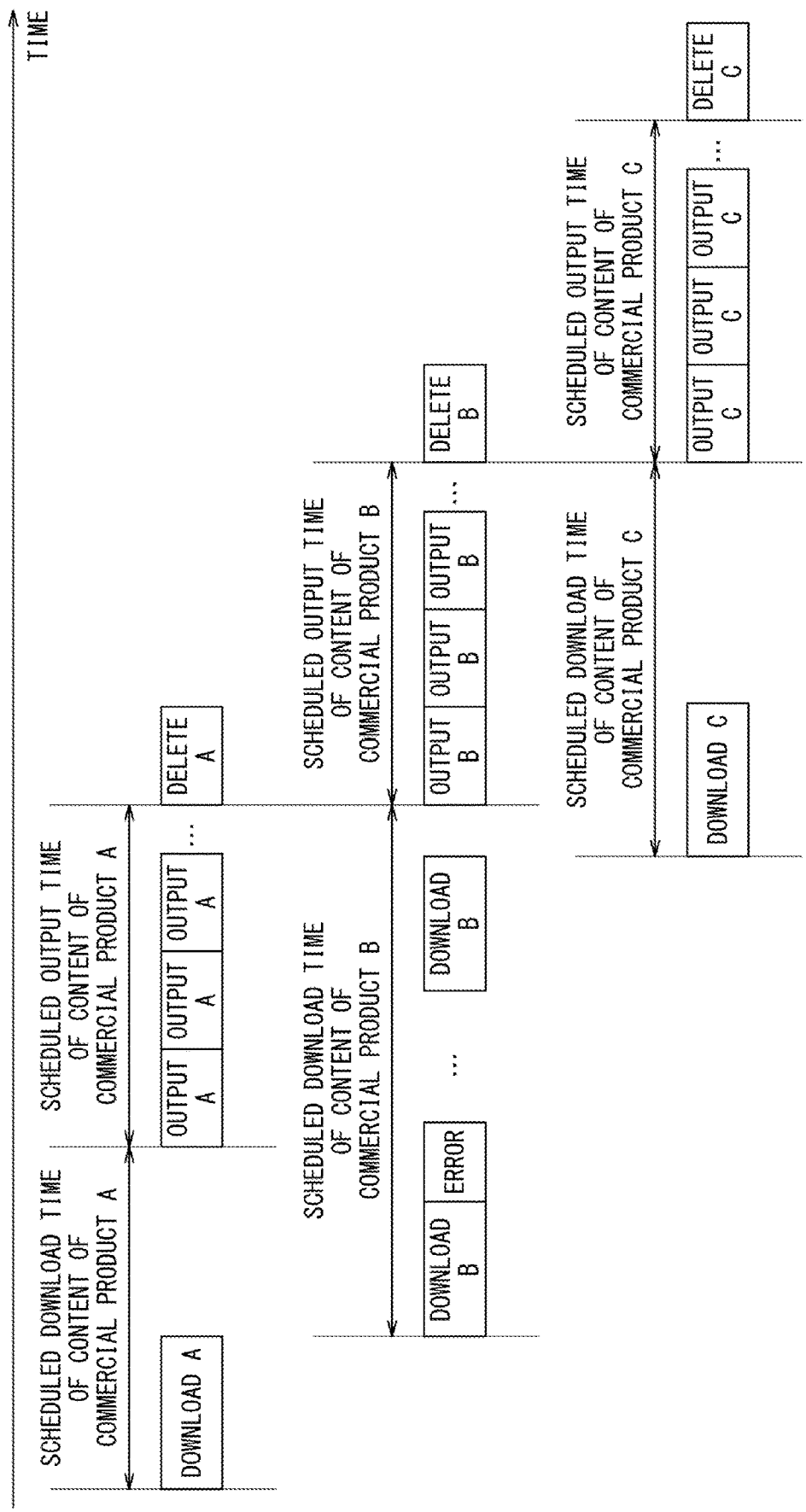
FIG. 13 illustrates the relation between a scheduled download period and a scheduled output period.

With reference to FIG. 13, content files of two or more commercial products can be outputted in accordance with their individual scheduled output period from a single store terminal 5. For example, the store terminal 5 is placed near a commercial product A to output its content file during the sales promotion period of the commercial product A, and then is moved near a commercial product B to output its content file after the sales promotion period of the commercial product A. It is noted that the scheduled output periods of content files for these commercial products should not overlap with each other in such a case.

The store 4 preliminarily notifies the content distributor 2 of these schedules. The content distributor 2 then determines the scheduled download period of each content file in reference to the scheduled output period of each content file. Downloading is performed every group of content files. In detail, content files corresponding one commercial product are treated as one set in the downloading. The content files in this set can be separately downloaded at different times within the scheduled download period.

For example, the download scheduled period of the commercial product A is determined prior to the scheduled output period of the group of content files of the commercial product A. The determined scheduled download period is within a range of a week before to the previous day. The store terminal 5 retrieves the group of content files of the commercial product A during the scheduled download period.

Such a process enables the group of content files to be downloaded prior to the scheduled output period of the group of the content files. Since downloading is performed at any time during the scheduled download period, the content file can be outputted without being affected by the state of the line, such as line disconnection.

If the current time (date) is within the scheduled download period, the downloader 50 of the store terminal 5 in this embodiment retrieves the group of content files corresponding to the scheduled download period from the management server 3 and stores the group in the content memory 61. The management server 3 can control the store terminal 5 placed in the LAN 6 of the store 4 to retrieves the group of content files. Furthermore, this system can eliminate the download operation of the group of content files through the store terminal 5 by a clerk of the store 4.

The downloader 50 retrieves the content file on the second commercial product, which is different from the first commercial product, from the management server 3 and stores this file in the content memory 61, during the first scheduled output period for outputting the content file on the first commercial product. Such a scheme allows the content file on the second commercial product to be retrieved for next output while the content file on the first commercial product is being outputted. Immediately after the first scheduled output period on the first commercial product is finished, the content file on the second commercial product can start.

The scheduled download periods of groups of content files corresponding to different commercial products may be overlapped with each other. Even in the case of overlapped scheduled download periods, individual download operations are independently performed. For example, if the scheduled download period of the group of content files of the commercial product A overlaps with the scheduled download period of the group of content files of the commercial product B, the group of content files of the commercial product B is downloaded after the download of the group of content files of the commercial product A is completed. Such a downloading scheme can reduce the peak load of the network lines.

If some form of error occurs during the download process of the group of content files of the commercial product B, the download process is retried. The download process of the group of content files of the commercial product B is completed before the scheduled output period of the content file of the commercial product B. The management server 3 can monitor the state of the download operation of the group of content files. If an error is observed, an employee of the content distributor 2 will go off to the store 4 for maintenance.

After the completion of the scheduled output period of the content file of the commercial product A, this content file of the commercial product A is deleted from the content memory 61 of the store terminal 5. In detail, the eraser 54 of the store terminal 5 deletes the group of content files corresponding to the scheduled output period after the current time (date) elapses the scheduled output period.

During the scheduled output period of the content file of the commercial product B, the content file of the commercial product B is outputted. After the download operation of the group of files of the commercial product B, the group of content files of the commercial product C having the next scheduled output period is downloaded. In this embodiment, before the download operation of the group of content files of the commercial product B, the download operation of the group of content files of the commercial product C is enqueued. After the scheduled output period of the content file of the commercial product B, the content file is deleted from the content memory 61 of the store terminal 5. The output of the content file of the commercial product C then starts. These operations are repeated.

In short, the content memory 61 of the store terminal 5 stores mere two or three groups of content files, but does not store four or more groups of content files. Since unnecessary groups of content files do not remain in the store terminal 5, the content memory 61 always has useful capacity. Since the group of content files are automatically deleted after the output scheduled period, any third party who takes the store terminal 5 cannot illegally use the group of content files, leading to protection of the copyright of the group of content files.

Figure 8:
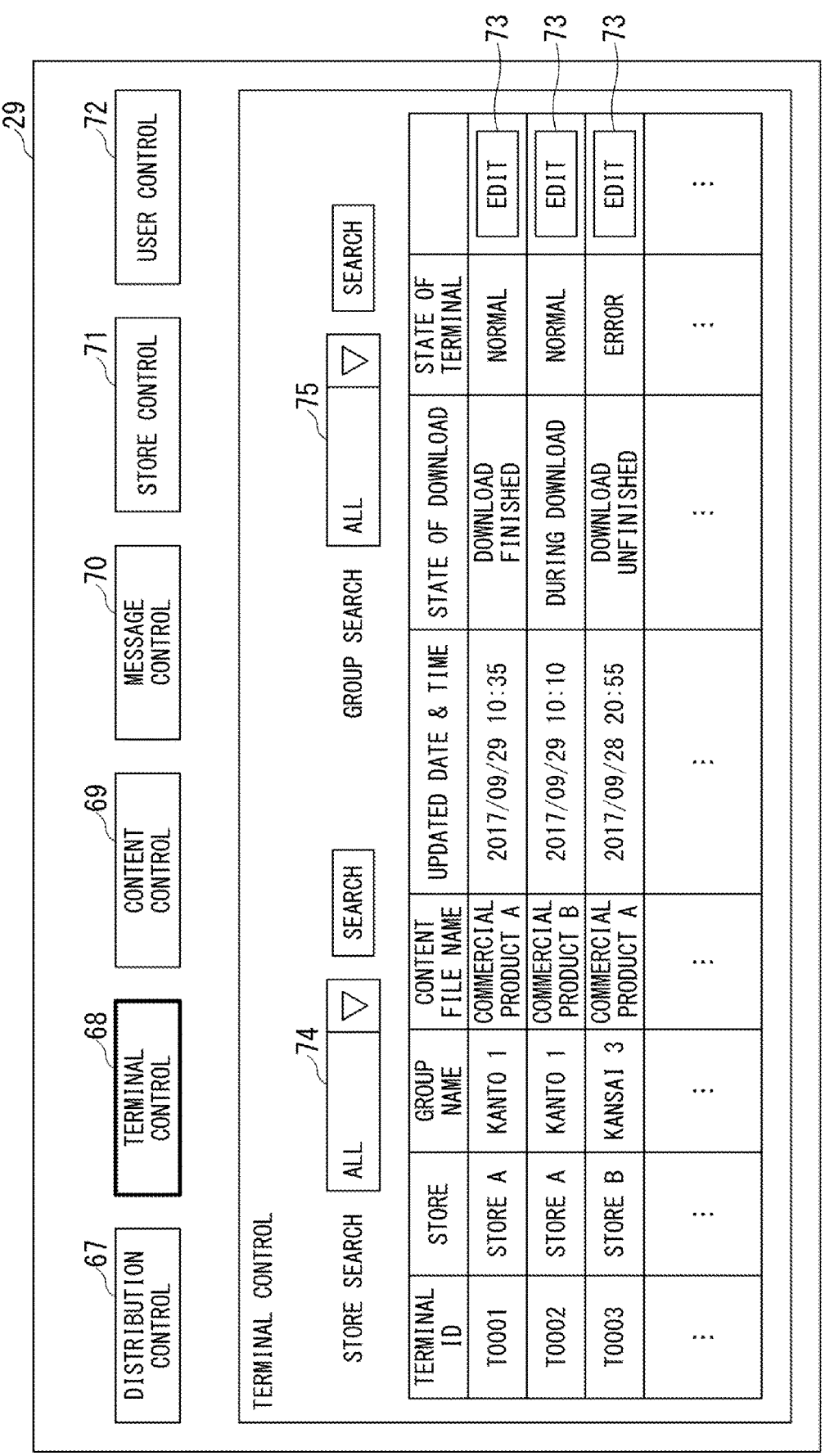
FIG. 8 illustrates a terminal management screen of the management server.

The management server 3 will now be described. The administrator of the management server 3 administers the delivery of each group of content files and the store terminals 5. With reference to FIG. 8, the control table appearing on the display unit 29 of the management server 3 includes a distribution control button 67 that controls the distribution schedule of the content files, a terminal control button 68 that controls store terminals 5, a content control button 69 that control content files, a message control button 70 that controls message details, a store control button 71 that controls the schedules of stores 4, and a user control button 72 that controls administrators (users) of the management servers 3.

In response to the selection of the terminal control button 68, a terminal control table appears on the screen. The terminal control table includes a terminal ID column, a terminal name column, a store name column that records the name of stores having the store terminals 5, a group name that records the name of the group to which each store terminal 5 belongs, a content file name downloaded by each store terminal 5, an updated date and time indicating the latest access time of each store terminal 5, a state of download of the group of content files, and a terminal state indicating the operational state (normal or not) of each store terminal 5. Edit buttons 73 are also provided for editing the schedule, for example, of individual store terminals 5. In response to the selection of one of the edit buttons 73, an edit menu of the schedule appears. The terminal control table also includes a pull down menu 74 capable of searching for every store and a pull down menu 75 capable of searching for every group.

With reference to FIG. 9(A), the schedule memory 35 of the management server 3 stores a distribution control table that controls the scheduled download period and the scheduled output period of each store terminal 5. The delivery control table includes a terminal ID column, a store name column that records the store 4 at which the terminal 5 correlated to the terminal ID is placed, a group name column that records the name of the group to which each store terminal 5 belongs, a content file name column that records the name of the content file downloaded at the store terminal 5 (for example, the corresponding commercial product name), a scheduled download period column corresponding to the content file, and an scheduled output period column corresponding to the content file. The scheduled download period and the scheduled output period may include not only date but also time. The distribution control table may further include any other information. The administrator can edit the overall information timely.

With reference to FIG. 9(B), the schedule memory 35 of the management server 3 includes a terminal control table that controls store terminals 5. The terminal control table includes a terminal ID column in correlation with each store terminal 5, a terminal name column that records the terminal name at a store terminal 5, a store column that records a store 4 having the store terminal 5, a group name column that records the name of the group to which each store terminal 5 belongs, a content file name column that records the name of the content file downloaded at the store terminal 5 (for example, the corresponding commercial product name), an access interval column that records the interval of access operations of each store terminal 5 to the management server 3, a start time column that indicates the start time of each store terminal 5, and an outage time that records the outage time of each store terminal 5. The start time and the outage time may include not only the time but also the date and day of the week. The terminal control table may further include any other information. The administrator can edit the overall information timely.

With reference to FIG. 10(A), the schedule memory 3 of the management server 3 includes a content file control table that controls groups of content files. The content file control table includes a content ID column that records content IDs for identifying groups of content files, a content file name that records the name of each group of content files (for example, name of the corresponding commercial product), a distribution period column that records the distribution period of each group of content files, a distribution state column that records the state of distribution of each group of content files, a main content column that records the main content file name, and sub-content columns that records sub-content file names. The distribution term of each group of content files indicates a term during which the corresponding group of content files can be downloaded and includes the scheduled download period set every store terminal 5. In other words, the distribution term is sufficiently longer than the scheduled download period. The content file control table may further include any other information. The administrator can edit the overall information timely.

With reference to FIG. 10(B), the schedule memory 35 of the management server 3 includes a message control table that controls the message details. The message control table includes each column that is correlated with a message ID column. Here, the each column is a message name column (for example, summarized message), a message detail column that records text data of message details, a distribution period column that records the distribution term of each message detail, and a distribution state column that records the state of distribution of each message detail. During each distribution period of each message detail, the message detail is downloaded and outputted from the store terminal 5. The distribution period of the message detail is determined independent of the scheduled download period (distribution period) of the group of content files. The message control table may further include any other information. The administrator can edit the overall information timely.

With reference to FIG. 11(A), the aggregated information memory 36 of the management server 3 includes a selected frequency information table that records aggregated frequency of selections of each sub-content file. The selected frequency information table includes a terminal ID column that records the identifier of a sore terminal 5, a store column that records the name of each store 4 at which the store terminal 5 is placed, a group name column that records the name of a group to which each store terminal 5 belongs, a content file name column that records the name of a content file (for example, the name of the corresponding commercial product), a selected time column that records the frequency of selections by customers of each selective input button 19 on the touch panel 15, and a selected frequency column that records the frequency of selections of each sub-content file. The overall information is recorded based on the aggregated information transmitted every predetermined time (for example, every five minutes) from each store terminal 5.

With reference to FIG. 11(B), the aggregated information memory 36 of the management server 3 includes the viewership information table that records the aggregated information of viewership of each content file. The viewership information table includes a terminal ID column that records the identifier of a store terminal 5, a store column that records the name of each store 4 at which the store terminal 5 is placed, a group name column that records the name of a group to which each store terminal 5 belongs, a content file name column that records the name of a content file (for example, the name of the corresponding commercial product), a viewing time column that records the viewing time at which customers have accessed the content file, a total viewer number column that records the total number of viewers who have accessed the content file, a male column that records the number of male viewers, a female column that records the member of female viewers, and age columns separated by age. The overall information is recorded based on the aggregated information transmitted every predetermined time (for example, every five minutes) from each store terminal 5.

Since the management server 3 collects the overall information, the content distributor 2 can administer all the store terminals 5 and comprehensively distributes the content files. Clerks at each store 4 are free from the maintenance of the store terminal (s) 5 and the delivery operations of the content files.

The operation on the production and delivery of a content file will now be explained with reference to the flow chart in FIG. 14. In the flow chart, for example, "Step 11" is abbreviated as "S11".

Figure 14:
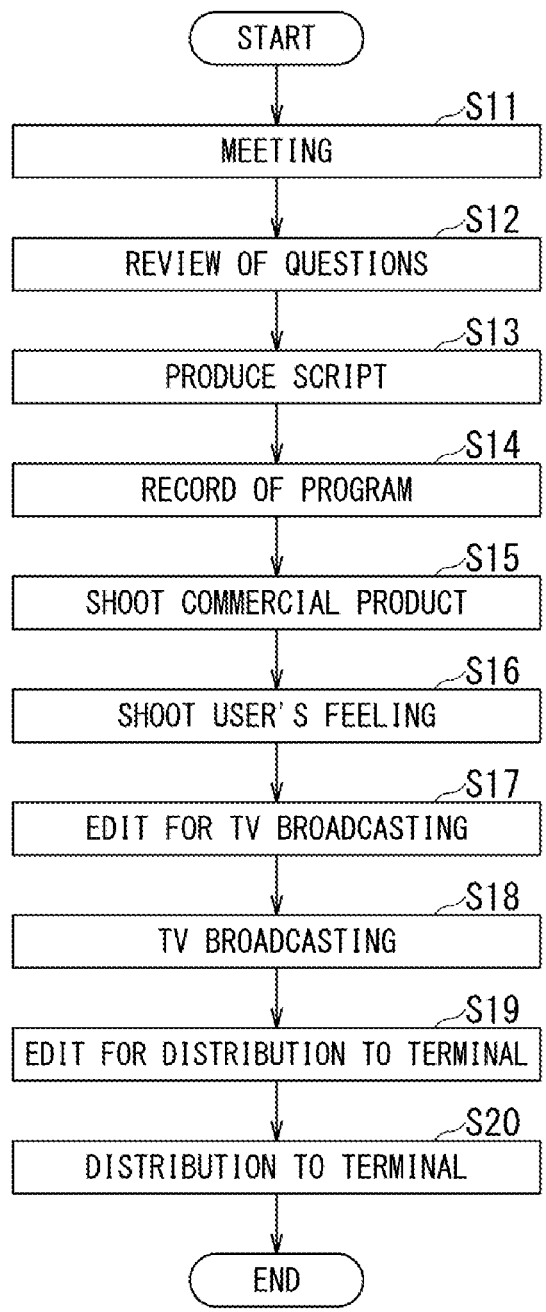
FIG. 14 is a flow chart of production of a content file and a distribution operation.

As shown in FIG. 14, the programming department 10 of the content distributor 2 holds a meeting for production of a program for home shopping of a commercial product 12 being a target of sales promotion (S11). In the meeting, cast members 23 are determined. The contract with the cast members 23 includes an available period of a video image, and the broadcasting period of this program and the distribution period of relevant content files are determined.

The programming department 10 lists items customers want to know on the commercial product 12, and reviews the questions to the cast members 23 in the home shopping program (S12). The answers to these questions correspond to sub-content files. The programming department 10 prepares a script of the home shopping program that reflects the reviewed questions (S13).

The programming department 10 records a program based on the produced script (S14). The programming department 10 then take pictures of the target commercial product 12 for introduction in detail (S15). The programming department 10 takes pictures on impressions of users who have actually used the commercial product 12 (S16). The programming department 10 edits the recorded images (video images) for TV broadcasting (S17). The programming department 10 sends the video images to a TV station 9 for TV broadcasting (S18).

The terminal distribution department 11 of the content distributor 2 reedits the video images used in TV broadcasting and not used in TV broadcasting to produce video image for distribution (S19). The terminal distribution department 11 starts distribution of the produced video images to terminals (S20). The content files of the video images are downloaded to store terminal 5 at which the images are play backed.

The processes carried out by the server controller 24 of the management server 3 and the terminal controller 39 of the store terminal 5 will now be explained with reference to flow charts shown in FIGS. 15 to 20, as well as the block diagram shown in FIG. 2, if necessary. The processes explained below are repeated every predetermined time. Through the repeated processes, the content delivery system 1 distributes the content file to terminals. Each control unit may interrupt its active job to execute the treatment described below.

Figure 15:
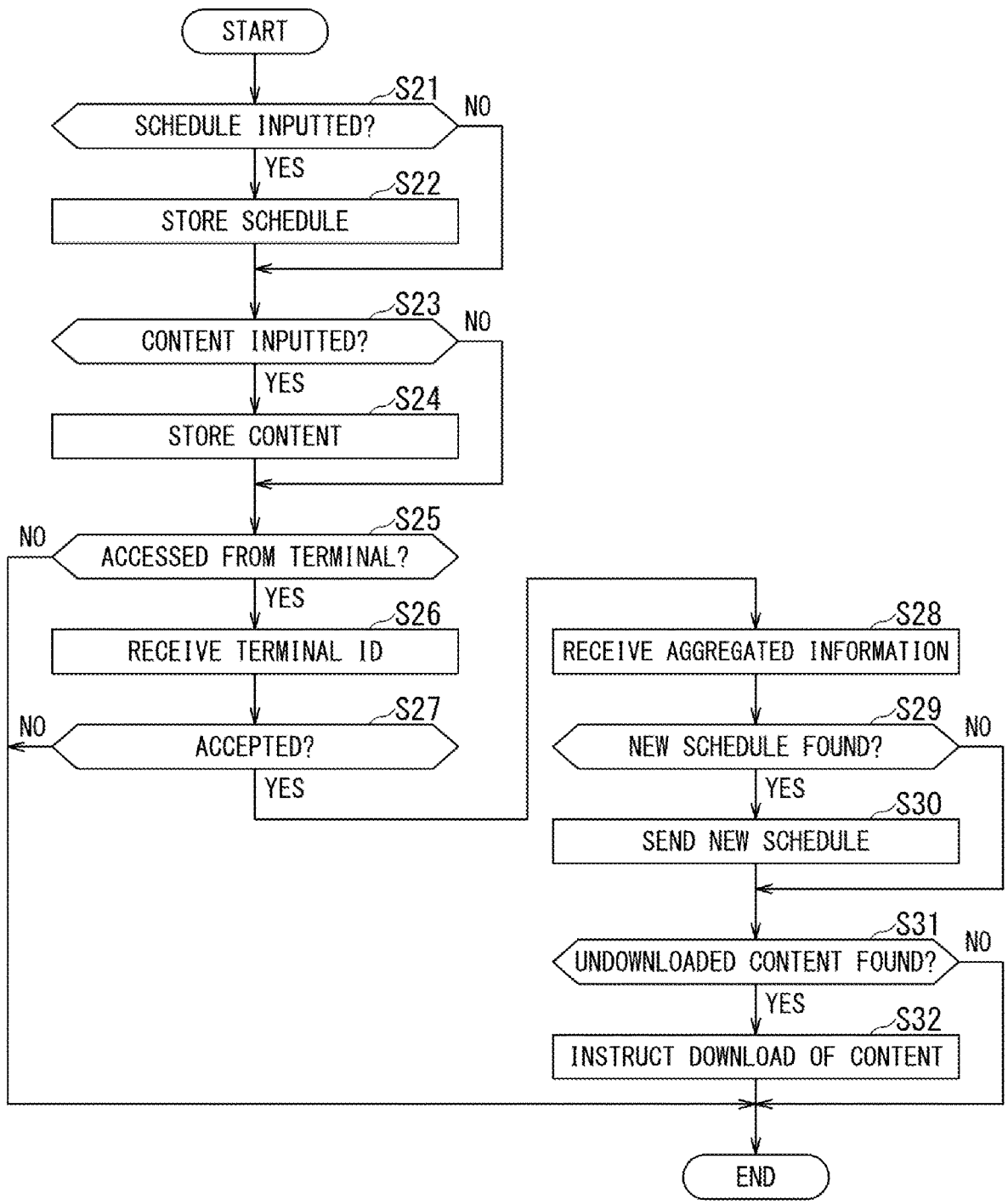
FIG. 15 is a flow chart of terminal management of a management server.

FIG. 15 illustrates terminal control process performed at the server controller 24 of the management server 3. The server controller 24 accepts an input operation for scheduling on each store terminal 5 and on each content file through a schedule acceptor 31, and determines whether an input operation for scheduling is performed (S21).

If no input operation for scheduling is determined (No in S21), the process goes to S23. If an input operation for scheduling is confirmed (YES in S21), the inputted schedule is stored onto the schedule memory 35 (S22), and the process goes to S23.

In S23, the server controller 24 determines whether the content file is inputted. If no input of the content file is determined (NO in S23), the process goes to S25. If the content file is inputted (YES in S23), the inputted content file is stored in the distributed information memory 34 (S24), and the process goes to S25.

In S25, the server controller 24 checks for access from the store terminal 5. If no access from the store terminal 5 is determined (NO in S25), the process is finished. If an access from the store terminal 5 is confirmed (YES in S25), the terminal ID receiver 32 accepts a terminal ID transmitted from the accessed store terminal 5 (S26), the process goes to S27.

In S27, the authenticator 33 of the server controller 24 determines whether the received terminal ID (identifier) is valid, in other words, a terminal ID preliminarily registered in the management server 3. If an invalid response is returned (No in S27), the process is finished. If a valid response is returned (YES in S27), the process goes to S28.

In S28, the server controller 24 receives aggregated information from the store terminal 5 and updates the information in the relevant tables stored in the aggregated information memory 36 based on the received aggregated information. Alternatively, the server controller 24 may update the information in the relevant tables stored in the schedule memory 35 based on the received aggregated information.

The server controller 24 determines whether the schedule correlated to the received terminal ID is updated, in other words, whether a new schedule correlated to the received terminal ID is present, with reference to the schedule memory 35 (S29). If no new schedule is found (No in S29), the process goes to S31. In a new schedule is found (YES in S29), the new schedule is transmitted to the store terminal 5 (S30), and the process goes to S31.

In S31, the server controller 24 determines whether a group of content files is found where the group of content files is correlated to the received terminal ID (identifier) and is not yet downloaded during the scheduled download period. If no undownloaded group of content files is found (No in S31), the process is finished. If an undownloaded group of content files is found (YES in S31), the server controller 24 notifies the store terminal 5 of an instruction on download of the group of content files (S32), and the process is finished.

Figure 16:
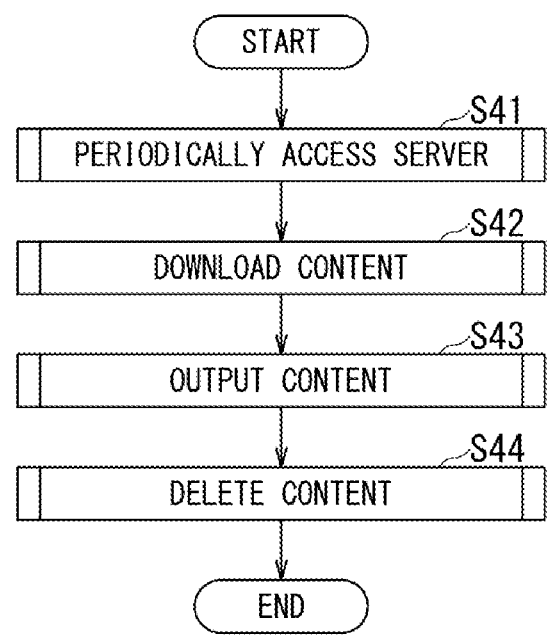
FIG. 16 is a flow chart of control of a store terminal.

FIG. 16 illustrates a main control process performed by the terminal controller 39 of the store terminal 5. The terminal controller 39 of the store terminal 5 periodically accesses the management server 3 every predetermined time (for example, every five minutes) (S41).

The downloader 50 of the terminal controller 39 retrieves the group of content files from the management server 3 and stores the group of content files in the content memory 61 by a download process (S42). The display controller 46 and the selector 48 of the terminal controller 39 outputs one of the content files on the main region 18 and from the speaker 37 by an output process (S43). The eraser 54 of the terminal controller 39 deletes the finished content file from the content memory 61 by a deletion process (S44), and the process is finished.

Figure 17:
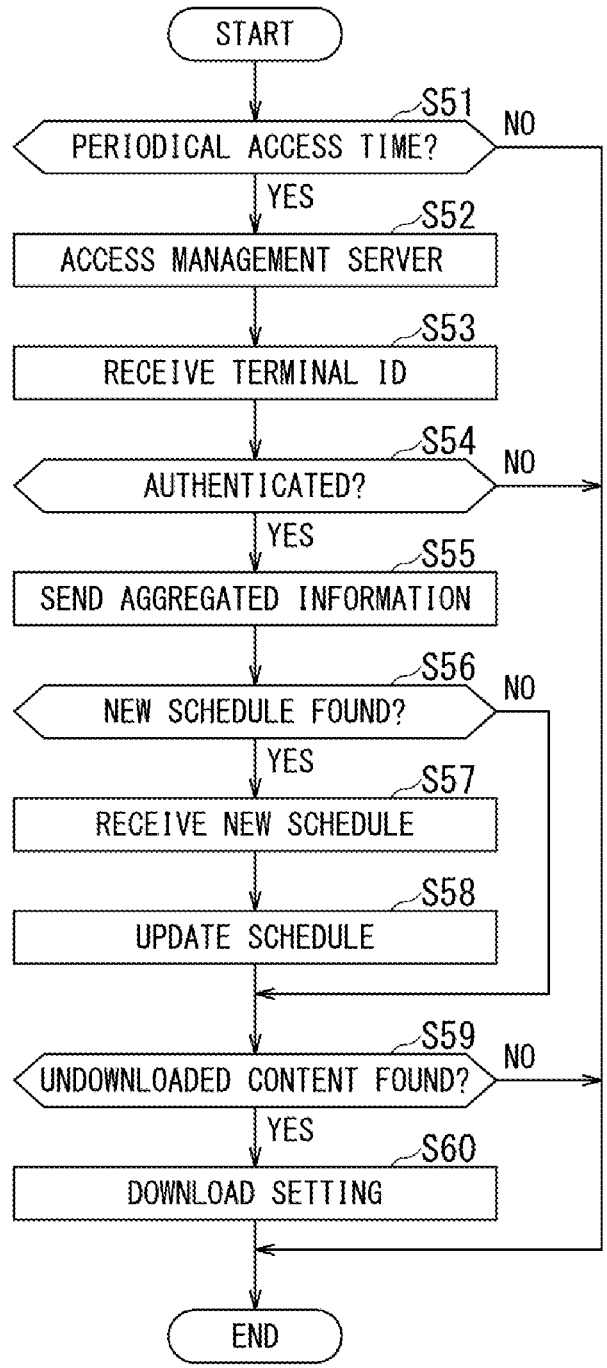
FIG. 17 is a flow chart illustrating a periodical access process of the store terminal.

FIG. 17 illustrates a periodical access process performed at the terminal controller 39 of the store terminal 5. The terminal controller 39 of the store terminal 5 determined whether the current time is a periodical access time with reference to the real-time clock 42 (S51). If the current time is not the periodical access time (NO in S51), the process is finished. If the current time is the periodical access time (YES in S51), the terminal controller 39 accesses through the communication unit 41 to the management server 3 (S52). The terminal ID transmitter 60 of the terminal controller 39 transmits the terminal ID (identifier) to the management server 3 (S53). The state information indicating the operational state of the store terminal 5 is also transmitted in connection with the terminal ID.

The terminal controller 39 determines the authentication by the management server 3 (S54). If the authentication is invalid (NO in S54), the process is finished. If the authentication is valid (YES in S54), the latest aggregated information that is aggregated on the information accumulated in the store terminal 5 and is stored in the terminal memory 40 is transmitted to the management server 3 (S55). The aggregated information is transmitted from the selected frequency transmitter 55, the selected time transmitter 56, and the headcount transmitter 59. After the aggregated information is transmitted to the management server 3, the finished aggregated information may be deleted.

The terminal controller 39 determines whether a new schedule correlated to the transmitted terminal ID (identifier) is found in the management server 3 (S56). If no new schedule is found in the management server 3 (NO in S56), the process goes to S59. If a new schedule is found in the management server 3 (YES in S56), the new schedule is received from the management server 3 (S57), the scheduler 62 is updated based on the received schedule (S58), and the process goes to S59.

In S59, the terminal controller 39 determines whether an undownloaded group of content files correlated to the transmitted terminal ID (identifier) is found. If no undownloaded group of content files is found (NO in S59), the process is finished. If an undownloaded group of content files is found (YES in S59), make settings to download the undownloaded group of content files by the download process (S60), and the process is finished.

Figure 18:
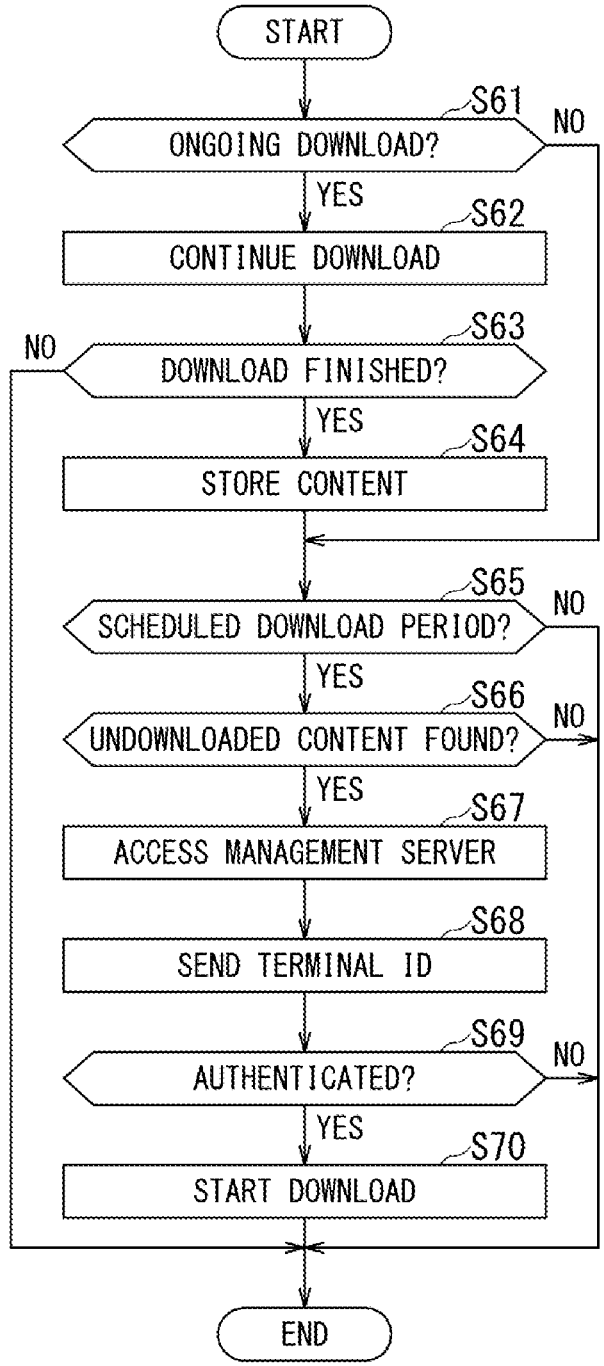
FIG. 18 is a flow chart of a download process of the store terminal.

FIG. 18 illustrates the download process performed by the terminal controller 39 of the store terminal 5. The downloader 50 of the terminal controller 39 of the store terminal 5 determines whether the group of content files is being downloaded (S61). If the download operation is not carried out (NO in S61), the process goes to S65 (described later). If the download operation is being carried out (YES in S61), the download operation is continued (S62), and then the process goes to S63.

In S63, the downloader 50 checks for the completion of the download of the group of content files. If the download operation is not finished (NO in S63), the process is finished. If the download is finished (YES in S63), the content memory 61 stores the downloaded group of content files (S64), and then the process goes to S65.

In S65, the download timer 51 of the terminal controller 39 determines whether the current time (date) is the scheduled download period of a predetermined group of content files set in the scheduler 62, with reference to the real-time clock 42. If the current time is not the scheduled download period (NO in S65), the process is finished. If the current time is the scheduled download period (YES in S65), the process goes to S66.

In S66, the downloader 50 determines whether the periodical access treatment establishes the download of the undownloaded group of content files, in other words whether an undownloaded group of content files is found. If no undownloaded group of content files is found (No in S66), the process is finished. If an undownloaded group of content files is found (YES in S66), the downloader 50 accesses the management server 3 (S67), and the terminal ID transmitter 60 sends the terminal ID (identifier) to the management server 3 (S68).

The downloader 50 then checks for the state of authentication at the management server 3 (S69). If the authentication is invalid (NO in S69), the process is finished. If the authentication is valid (YES in S69), the download of the undownloaded group of content files starts (S70), and the process is finished.

Figure 19:
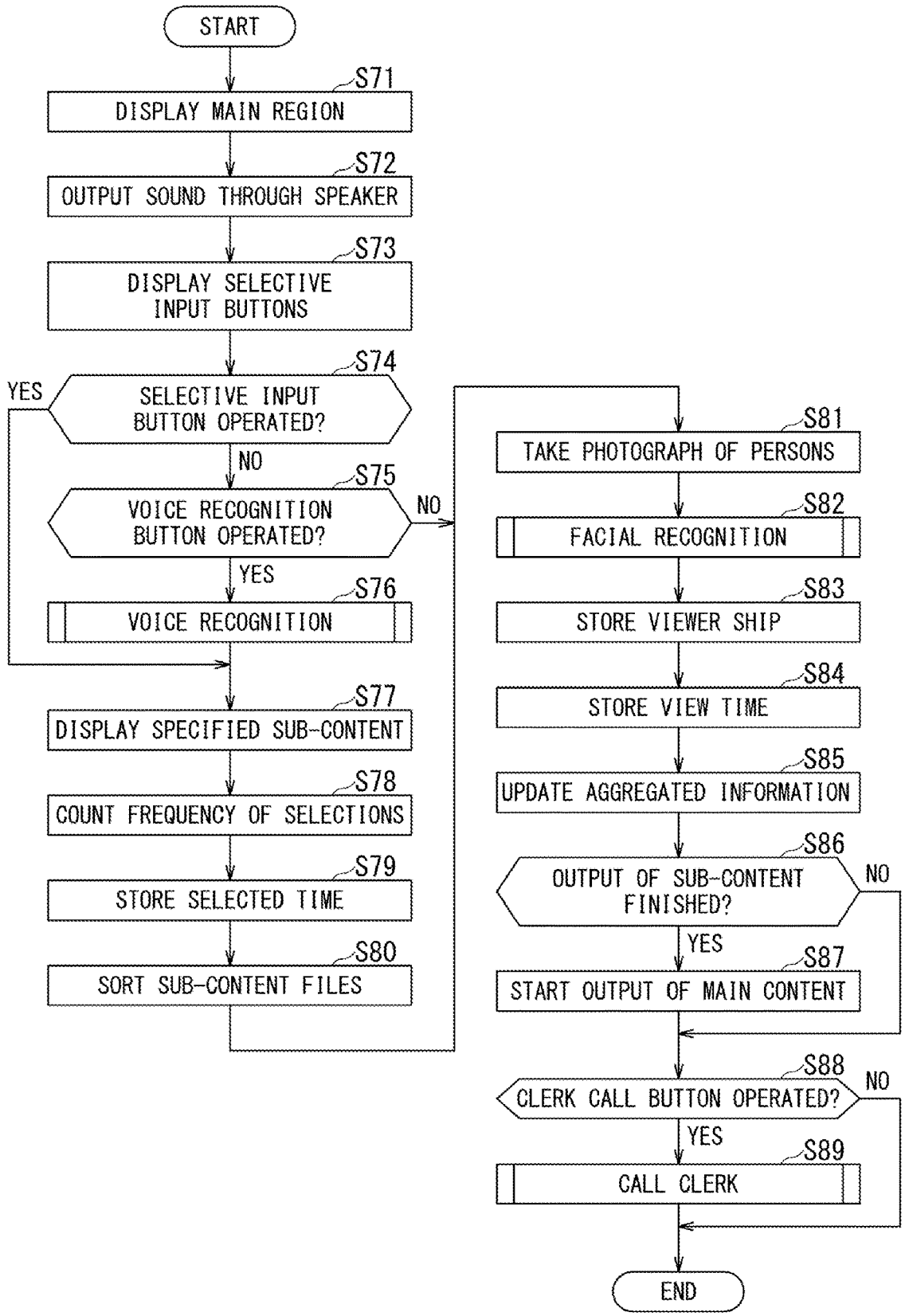
FIG. 19 is a flow chart of an output process of the content file from the store terminal.

FIG. 19 illustrates the output process for the content file performed at the terminal controller 39 of the store terminal 5. The display controller 46 of the terminal controller 39 of the store terminal 5 controls the main regions 18 to appear on the screen of the touch panel 15 (S71). During the output of the content file, the display controller 46 controls the output of the content file.

The terminal controller 39 then outputs a sound on the content file through the speaker 37 (S72). The display controller 46 controls the selective input buttons 19 to appear on the screen of the touch panel 15 (S73).

The input acceptor 47 of the terminal controller 39 checks for the touch operation of any one of the selective input buttons 19 (S74). If the touch operation of the selective input button 19 is determined (YES in S74), the process goes to S77. If no touch operation of the selective input button 19 is determined (NO in S74), the process goes to S75.

In S75, the input acceptor 47 checks for the touch operation of the voice recognition button 22. If no touch operation of the voice recognition button 22 is confirmed (NO in S75), the process goes to S81. If a touch operation of the voice recognition button 22 is confirmed (YES in S75), the voice of a customer inputted from the microphone 38 is analyzed (S76), and the process goes to S77. The voice recognizer 58 analyzes the voice to specify the sub-content file the customer wants to output.

In S77, the selector 48 of the terminal controller 39 selectively displays the sub-content file corresponding to the touched selective input button 19 or the sub-content file specified at the voice recognizer 58 on the main region 18.

The terminal controller 39 adds one to the frequency of selections stored in the counter 63 according to the sub-content file corresponding to the touched selective input button 19 or the sub-content file specified by the voice recognizer 58 (S78). The terminal controller 39 stores the time of the touch operation or voice input as a selected time in the selected time memory 64 (S79).

The switcher 49 of the terminal controller 39 sorts the sub-content files corresponding to each selective input button 19 by the frequency of selections of the sub-content files (S80). For example, the sub-content files are sorted by the frequency of selections. Alternatively, the sub-content files may be sorted by the potential frequency of next selections.

In S81, the terminal controller 39 allows the camera 17 to take a photograph of persons in front of the touch panel 15. The face recognizer 57 of the terminal controller 39 analyzes the persons in the photograph taken by the camera 17 using a facial recognition algorithm to identify the persons individually (S82).

The terminal controller 39 tallies up the number of customers who stay for a predetermined time or more in front of the touch panel 15 and stores the viewership onto the viewership memory 65 (S83). The terminal controller 39 then stores the view time corresponding to the viewership onto the viewing time memory 66 (S84).

The terminal controller 39 updates the aggregated information to be transmitted to the management server 3, based on the information stored in the counter 63, the selected time memory 64, the viewership memory 65, and the viewing time memory 66 (S85).

While the sub-content file appears on the main region 18, the selector 48 checks for the end time of the output of the sub-content file (S86). If the end time of the output of the sub-content file is not up (NO in S86), the process goes to S88. If the end time of the output of the sub-content file is up (YES in S86), the file appearing on the main region 18 varies from the sub-content file to the main content file. The main content file is then outputted (S87).

In S88, the input acceptor 47 checks for the touch operation of the clerk call button 21. If the clerk call button 21 has not been touched (No in S88), the process is finished. If the clerk call button 21 has been touched (YES in S88), a process for calling a clerk for predetermined notice is performed (S89), and the process is finished.

Figure 20:
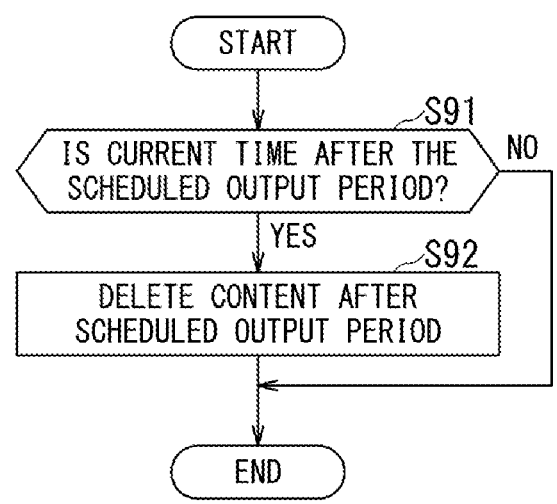
FIG. 20 is a flowchart of a deletion process of the content file from the store terminal.

FIG. 20 illustrates the deletion process of the content file performed at the terminal controller 39 of the store terminal 5. The final output determiner 53 of the store terminal 5 retrieves the current time (date) from the real-time clock 42, and determines whether the current time is after the scheduled output period of the content file. In detail, the final output determiner 53 determines whether a group of content files after the scheduled output period is found in the groups of content files stored in the content memory 61, with reference to the scheduler 62 (S91).

No group of content files after the scheduled output period is found (No in S91), the process is finished. If a group of content files after the scheduled output period is found (YES in S91), the eraser 54 of the terminal controller 39 deletes the group of content files from the content memory 61 (S92), and the process is finished.

Although a mode in which each step is executed in series is illustrated in the flowcharts of the embodiment, the execution order of the respective steps is not necessarily fixed and the execution order of part of the steps may be changed. Additionally, some steps may be executed in parallel with another step.

Note that each program executed in the system of the embodiment is provided by being incorporated in a memory such as a ROM in advance. Additionally or alternatively, each program may be provided by being stored as a file of installable or executable format in a non-transitory computer-readable storage medium such as a CD-ROM, a CD-R, a memory card, a DVD, and a flexible disk (FD).

In addition, each program executed in the system may be stored on a computer connected to a network such as the Internet and be provided by being downloaded via a network. Further, the system can also be configured by interconnecting and combining separate modules, which independently exhibit respective functions of the components, via a network or a dedicated line.

In this embodiment, one main content file corresponds to one type of commercial product 12. Alternatively, two or more main content files may be provided for one type of commercial product 12.

In this embodiment, the screen of the touch panel 15 has a main region 18 and selective input buttons 19. Alternatively, the screen of the touch panel 15 may have only selective input buttons 19.

In this embodiment, the output unit for outputting the content file includes the main region 18 and the speaker 37. Alternatively, the output unit may include only the speaker 37. In other words, the content file may be outputted only by voice. The touch panel 15 may perform only a section operation of a sub-content file without output of the content file.

In this embodiment, the exemplified content file is a video image. Alternatively, the content file may include only textual data.

In this embodiment, the content delivery system 1 consists of a single management server 3. Alternatively, the system may consist of two or more servers. For example, a distribution server for distributing the content file and a terminal management server controlling store terminals 5 may be independently provided.

Although the management server 3 downloads the content file to the store terminal 5 in this embodiment, any other configuration is also available. For example, the content file may be stored in the content memory 61 before the store terminal 5 is installed in the store 4. In other words, the store terminal 5 may run on a stand-alone basis without connection to a network. In another embodiment, an employee of the content distributor 2 may store the content file in a USB memory that is then connected to the store terminal 5 to store the content file in the content memory 61.

Exchange of information may be performed between two or more terminal 5 via the LAN 6 in the store 4. For example, a content file downloaded from the management server 3 may be transmitted from one store terminal 5 to any other store terminal 5 via the LAN 6.

The exemplified store terminal 5 is of a tablet type. Any other type of store terminal 5 may also be used. For example, the store terminal 5 may be a notebook or desktop personal commuter.

The store terminal 5 may display one or more selective input buttons 19 for content files other than the content file that appears on the main region 18, on the screen. Alternatively, the store terminal 5 may display a selective input button 19 corresponding to the content file appearing on the main region 18 on the screen and the content file may be play backed from the beginning on the main region 18 through a touch operation of the selective input button 19.

The store terminal 5 may include a deep learning unit which is a computer provided with an artificial intelligence (AI) performing machine learning. The artificial intelligence will interpret customers' questions to present proper answers.

The content file to be downloaded from the management server 3 or to be stored in the store terminal 5 may be encrypted.

A predetermined content file unrelated to the commercial product 12 may be stored in the content memory 61 of the store terminal 5 to be displayed on the main region 18 of the touch panel 15 at any time other than the schedule output period of the commercial product 12. For example, such a content file may be a video image that introduces the store itself.

In the case where no replay is prepared for customer's question from the store terminal 5, the customer may call for a call center through a given operation. For example, if the store terminal 5 is not provided with an answer to customer's question, a button for connection to the call center appears on the screen and the customer can access an operator (expert on the commercial product) in the content distributor 2 through a touch operation of the button. The operator can replay the question from the customer through interactive conversation like TV telephone or voice call. A call button for calling for an operator is displayed by default in place of the clerk call button 21.

Two or more store terminals 5 each provided with a camera 17 may be installed in the store to observe movement of customers and to store the results of the movement. The traffic lines of the customers in the store can thereby analyzed.

In the content delivery system 1 of this embodiment, the content distributor 2 allows the store terminal 5 to play a role of a clerk in the store 4 through remote control of the store terminal 5. Instead of a clerk, the store terminal 5 can provide a proper reply for a question by a customer. The customer may retrieve necessary information through a touch operation of the store terminal 5, may call for a clerk using the clerk call button 21, or may call for an operator in the content distributor 2 using an operator calling button. In summary, the customer can readily get necessary information through a preferred means in this system.

The content delivery system 1 of this embodiment can readily and timely replace content files to be outputted from store terminals 5 in response to replacement of commercial products, needs of customers, seasons, and times.

The content distributor 2 having the management server 3 and the stores 4 having the store terminals 5 may reside in different countries.

According to the embodiment described above, a selector is provided for changing the output of the content file corresponding to the selective input button, so that a customer can readily get necessary information about commercial products displayed in a store.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

1 . . . content delivery system, 2 . . . content distributor, 3 . . . management server, 4 . . . store, 5 . . . store terminal, 6 . . . LAN, 7 . . . router, 8 . . . the Internet, 9 . . . TV station, 10 . . . programming department, 11 . . . terminal distribution department, 12 . . . commercial products, 13 . . . display stand, 14 . . . retainer, 15 . . . touch panel, 16 . . . main switch, 17 . . . camera, 18 . . . main region, 19 . . . selective input button, 20 . . . message display area, 21 . . . clerk call button, 22 . . . voice recognition button, 23 . . . cast member, 24 . . . server controller, 25 . . . server memory, 26 . . . communication unit, 27 . . . real-time clock, 28 . . . input unit, 29 . . . display unit, 30 . . . main controller, 31 . . . schedule acceptor, 32 . . . terminal ID receiver, 33 . . . authenticator, 34 . . . distributed information memory, 35 . . . schedule memory, 36 . . . aggregated information memory, 37 . . . speaker, 38 . . . microphone, 39 . . . terminal controller, 40 . . . terminal memory, 41 . . . communication unit, 42 . . . real-time clock, 43 . . . start controller, 44 . . . stop controller, 45 . . . main controller, 46 . . . display controller, 47 . . . input acceptor, 48 . . . selector, 49 . . . switcher, 50 . . . downloader, 51 . . . download timer, 52 . . . terminal state transmitter, 53 . . . final output determiner, 54 . . . eraser, 55 . . . selected frequency transmitter, 56 . . . selected time transmitter, 57 . . . face recognizer, 58 . . . voice recognizer, 59 . . . headcount transmitter, 60 . . . terminal ID transmitter, 61 . . . content memory, 62 . . . scheduler, 63 . . . counter, 64 . . . selected time memory, 65 . . . viewership memory, 66 . . . viewing time memory, 67 . . . distribution control button, 68 . . . terminal control button, 69 . . . content control button, 70 . . . message control button, 71 . . . store control button, 72 . . . user control button, 73 . . . edit button, 74,75 . . . pulldown menu, 80 . . . Internet delivery department.

The invention claimed is:

1. A content delivery system comprising:
a terminal controller for determining whether a current time is a predetermined access time;
an access unit for accessing a server in a case where the terminal controller for determines that the current time is the predetermined access time;
an identifier transmitter for sending identifiers to the server, the identifiers being capable of identifying individual terminals trying to access the server;
a scheduler for receiving schedules corresponding to the transmitted identifiers from the server;
a content memory for recording a plurality of content files corresponding to a plurality of information items on one commercial product that is a target of sales promotion, wherein one of the schedules corresponds to a scheduled output period for outputting one or more of the content files;
an output unit for outputting one of the content files in the scheduled output period;
a touch panel for displaying selective input buttons that correspond to the outputted one of the content files on a screen of the touch panel in the scheduled output period;
an input acceptor for accepting an input operation from one of the selective input buttons; and
a selector for selecting a content file among the content files, the selected content file corresponding to the touched selective input button and for outputting the selected content file to the output unit, in response to the touch operation of the selective input button.

2. The content delivery system set forth in claim 1, further comprising:
an access unit for accessing the server;
an identifier transmitter for sending identifiers to the server, the identifiers being capable of identifying individual terminals trying to access the server; and
a downloader for downloading one of the content files corresponding to the transmitted identifier from the server and storing the content file in the content memory.

3. The content delivery system set forth in claim 1, further comprising:
a download timer for determining whether the current time determined as the predetermined access time is within a scheduled download period prior to a scheduled output period during which one of the content files is scheduled to be outputted; and
a downloader for downloading at least one of the content files from a server and storing the content file in the content memory in the case where the current time is within the scheduled download period.

4. The content delivery system set forth in claim 1, further comprising:
a final output determiner for determining whether the current time is after the scheduled output period during which the content file is scheduled to be outputted; and
an eraser for deleting the content file corresponding to the scheduled output period from the content memory in the case where the current time is after the scheduled output period.

5. The content delivery system set forth in claim 1, further comprising:
a counter for counting the frequency of selections of the content file corresponding to the touched selective input button in response to the touch operation of the selective input button; and
a selected frequency transmitter for sending information to the server, the information being capable of identifying the frequency of selections of the content file.

6. The content delivery system set forth in claim 1, further comprising:
a selected time memory for storing the time at which the content file corresponding to the selective input button is selected in response to the touch operation of the selective input button; and
a selected time transmitter for sending information to the server, the information being capable of identifying the time at which the content file is selected.

7. The content delivery system set forth in claim 1, further comprising:
a camera for shooting a photograph of persons residing in front of the touch panel;
a face recognizer for analyzing the faces of the persons in the photograph through a facial recognition algorithm to individually identify the persons; and
a headcount transmitter for sending information to the server, the information being capable of determining the number of persons residing in front of the touch panel for a predetermined time or more.

8. The content delivery system set forth in claim 1, further comprising:
a display controller for presenting the selective input buttons in a predetermined sequence on the screen of the touch panel;
a counter for counting the frequency of selections of the content file corresponding to the selective input button in response to the input operation of one of the selective input buttons; and
a switcher for changing the content file corresponding to each selective input button based on the frequency of selections of the content file.

9. The content delivery system set forth in claim 1, further comprising:
a display controller for displaying a main region and the plurality of selective input buttons, the main region displaying the image of the content file, the selective input buttons having an area smaller than the area of the main region on the screen of the touch panel.

10. The content delivery system set forth in claim 1, further comprising:
a downloader for downloading the content files on a second commercial product from the server and storing the content files in the content memory within a first scheduled output period during which the content file on a first commercial product is scheduled to be outputted.

11. The content delivery system set forth in claim 1, wherein
the content files comprise a single main content file and a plurality of sub-content files having a playback time shorter than the playback time of the main content file; and
the selector outputs the main content file through the output unit after the sub-content file is outputted through the output unit.

12. The content delivery system set forth in claim 1, further comprising:
the terminals disposed in the vicinity of the commercial product, the terminals outputting the content files; and
the server accessible from the terminals through the Internet, the server comprising:
a schedule acceptor for accepting an input operation of the schedule corresponding to each of the terminals;
a schedule memory for storing the accepted schedule in connection with an identifier that is capable of identifying the corresponding terminal;
an identifier receiver for receiving the identifier from each terminal accessed through the Internet; and
an authenticator for permitting the terminal to receive the schedule in connection with the identifier.

13. A content delivery method, comprising:
determining, by a terminal, whether a current time is a predetermined access time;
accessing a server in a case where the terminal controller for determines that the current time is the predetermined access time;
sending identifiers to the server, the identifiers being capable of identifying individual terminals trying to access the server;
receiving schedules corresponding to the transmitted identifiers from the server;
storing a plurality of content files corresponding to a plurality of information items, respectively, on a commercial product that is a target of sales promotion, wherein one of the schedules corresponds to a scheduled output period for outputting one or more of the content files;
outputting one of the content files through an output unit of the terminal in the scheduled output period;
displaying selective input buttons corresponding to the outputted one of the content files, on a screen of a touch panel of the terminal in the scheduled output period;
accepting, by the terminal, the input operation from one of the selective input buttons; and
outputting, by the terminal, the content file corresponding to the selective input button from the output unit in response to an input operation of the selective input button.

* * * * *